(12) United States Patent
Yaginuma

(10) Patent No.: US 6,988,090 B2
(45) Date of Patent: Jan. 17, 2006

(54) PREDICTION ANALYSIS APPARATUS AND PROGRAM STORAGE MEDIUM THEREFOR

(75) Inventor: Yoshinori Yaginuma, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 910 days.

(21) Appl. No.: 09/817,257

(22) Filed: Mar. 27, 2001

(65) Prior Publication Data

US 2002/0049685 A1    Apr. 25, 2002

(30) Foreign Application Priority Data

Oct. 25, 2000    (JP)    ............... 2000-325213

(51) Int. Cl.
*G06E 1/00*    (2006.01)
(52) U.S. Cl. ............... 706/21; 706/12; 706/15
(58) Field of Classification Search ............ 706/21, 706/52, 56, 2, 12, 15–17, 25
See application file for complete search history.

(56) References Cited

U.S. PATENT DOCUMENTS

| | | | | |
|---|---|---|---|---|
| 5,267,502 A | * | 12/1993 | Gent et al. ............... 89/41.03 |
| 5,577,169 A | * | 11/1996 | Prezioso ............... 706/52 |
| 5,692,107 A | * | 11/1997 | Simoudis et al. ............... 706/12 |
| 5,701,400 A | * | 12/1997 | Amado ............... 706/45 |
| 5,724,488 A | * | 3/1998 | Prezioso ............... 706/52 |
| 6,108,648 A | * | 8/2000 | Lakshmi et al. ............... 707/2 |
| 6,243,696 B1 | * | 6/2001 | Keeler et al. ............... 706/21 |
| 6,353,816 B1 | * | 3/2002 | Tsukimoto ............... 706/17 |
| 6,708,160 B1 | * | 3/2004 | Werbos ............... 706/30 |
| 6,735,630 B1 | * | 5/2004 | Gelvin et al. ............... 709/224 |
| 6,748,369 B2 | * | 6/2004 | Khedkar et al. ............... 706/6 |
| 6,850,252 B1 | * | 2/2005 | Hoffberg ............... 715/716 |
| 6,879,971 B1 | * | 4/2005 | Keeler et al. ............... 706/21 |
| 6,904,423 B1 | * | 6/2005 | Nicolaou et al. ............... 706/46 |

FOREIGN PATENT DOCUMENTS

JP    A-2000-155681    6/2000

OTHER PUBLICATIONS

Basak et al, "Weather data mining using independent component analysis", Jour. of Machine Learning, 5 (2004), pp 239-253.*
Hashemi et al, "Preciction capability of neural networks trained by monte carlo paradigm", ACM pp 9-13, 1993.*
Jimenez et al, "Neural methods for dynamic branch prediction", ACM Trans on Computer Sys. vol. 20, No. 4, pp 369-397, Nov. 2002.*
Panayiotou et al, "Model abstraction for discrete event system using neural networks and sensitivity information", ACM Proc. of the winter simulation conf. pp 335-341, 2000.*
Kolarik et al, "time series forecasting using neural networks", ACM APL, pp 86-94, 1994.*
Suites et al, "Defect prediction with neural networks", ACM pp 199-206, 1991.*

* cited by examiner

*Primary Examiner*—Anil Khatri
(74) *Attorney, Agent, or Firm*—Staas & Halsey LLP

(57) ABSTRACT

A prediction analysis apparatus includes a prediction unit for predicting a result value corresponding to one or more attribute values of unknown data using known data indicating the correspondence between one or more attribute values and corresponding result values, and an analysis unit for outputting analysis information indicating how at least one attribute value of the unknown data is to be amended to change a result value predicted by the prediction unit into a desired prediction value. The prediction analysis apparatus with the configuration can be realized by, for example, a computer executing a program for realizing the function of each of the above mentioned units.

20 Claims, 22 Drawing Sheets

[TEMPERATURE 1 ≧ 15] → OK
[TEMPERATURE 1 < 15] ∧ [PRESSURE < 1.4] → NG
[TEMPERATURE 1 < 15] ∧ [PRESSURE ≧ 1.4] → OK

| | TEMPERATURE 1 | TEMPERATURE 2 | PRESSURE | ... | RESULT |
|---|---|---|---|---|---|
| No. 1 | 15.3 | 10.4 | 2.0 | ... | OK |
| No. 2 | 13.6 | 11.5 | 1.3 | ... | NG |
| No. 3 | 14.9 | 8.2 | 1.5 | ... | OK |
| ... | | | | ... | ... |

F I G. 5 A

| | TEMPERATURE 1 | TEMPERATURE 2 | PRESSURE | ... | RESULT |
|---|---|---|---|---|---|
| No. 101 | 13.8 | 8.9 | 1.9 | ... | ? |
| No. 102 | 17.1 | 12.3 | 2.2 | ... | ? |
| ... | | | | ... | ... |

F I G. 5 B $$R = \frac{1}{2}\sum_i (t_i - O_i^n)^2$$

$$\Delta W_{i,j}^{k-1,k} = \varepsilon\left[-\frac{\partial R}{\partial W_{i,j}^{k-1,k}}\right] \qquad \Delta\theta_{i,j}^{k-1,k} = \varepsilon\left[-\frac{\partial R}{\partial \theta_{i,j}^{k-1,k}}\right]$$

$$= \varepsilon\left[-\frac{\partial R}{\partial I_i^k}\cdot\frac{\partial I_i^k}{\partial W_{i,j}^{k-1,k}}\right] \qquad = \varepsilon\left[-\frac{\partial R}{\partial I_i^k}\cdot\frac{\partial I_i^k}{\partial \theta_{i,j}^{k-1,k}}\right]$$

$$= \varepsilon\left[-\frac{\partial R}{\partial I_i^k}\right]\cdot O_j^{k-1} \qquad = \varepsilon\left[-\frac{\partial R}{\partial I_i^k}\right]$$

$$= \varepsilon\cdot\delta_i^k\cdot O_j^{k-1} \qquad\qquad = \varepsilon\cdot\delta_i^k$$

F I G. 9A

\* IN CASE OF k = n  (FINAL STAGE) \qquad \* IN CASE OF k ≠ n $$\delta_i^n = -\frac{\partial R}{\partial I_i^n} \qquad\qquad \delta_i^k = -\frac{\partial R}{\partial I_i^k}$$

$$= -\frac{\partial R}{\partial O_i^n}\cdot\frac{\partial O_i^n}{\partial I_i^n} \qquad = -\sum_m \frac{\partial R}{\partial I_m^{k+1}}\cdot\frac{\partial I_m^{k+1}}{\partial O_i^k}\cdot\frac{\partial O_i^k}{\partial I_i^k}$$

$$= (t_i - O_i^n)f'(I_i^n) \qquad = -\sum_m \frac{\partial R}{\partial I_m^{k+1}}\cdot W_{m,i}^{k,k+1}\cdot f'(I_i^k)$$

$$\qquad\qquad\qquad\qquad = \sum \delta_m^{k+1}\, W_{m,i}^{k,k+1}\, f'(I_i^k)$$

F I G. 9B $$\Delta W_{i,j}^{k-1,k}(n) = \varepsilon\cdot\delta_i^k\cdot O_j^{k-1} + \alpha\cdot\Delta W_{i,j}^{k-1,k}(n-1)$$

$$\Delta\theta_{i,j}^{k-1,k}(n) = \varepsilon\cdot\delta_i^k + \alpha\cdot\Delta\theta_{i,j}^{k-1,k}(n-1)$$

F I G. 9C $$f(x) = \frac{1}{1+\exp(-x)}$$

$$\frac{df(x)}{dx} = f'(x) = f(x) \cdot \{1 - f(x)\}$$

$$\delta_i^n = (t_i - O_i^n) \cdot O_i^n \cdot (1 - O_i^n)$$

$$\delta_i^k = \sum_m \delta_m^{k+1} \cdot W_{m,i}^{k,k+1} \cdot O_i^k \cdot (1 - O_i^k)$$

$$\Delta W_{i,j}^{k-1,k}(n) = \varepsilon \cdot \delta_i^k \cdot O_j^{k-1} + \alpha \cdot \Delta W_{i,j}^{k-1,k}(n-1) + S$$

$$\Delta \theta_{i,j}^{k-1,k}(n) = \varepsilon \cdot \delta_i^k + \alpha \cdot \Delta \theta_{i,j}^{k-1,k}(n-1) + S$$

$$S = -s \cdot \frac{1}{m} \text{sgn}\left(W_{i,j}^{k-1,k}(n)\right) \cdot \left\{ \sum_{i=1,}^{m} \left|W_{i,j}^{k-1,k}(n)\right| + \left|\theta_{i,j}^{k-1,k}(n)\right| \right\}$$

S: GROWTH CONTROL ITEM
s : GROWTH CONTROL COEFFICIENT
m : NUMBER OF UNITS IN (k-1)TH LAYER
W, θ : WEIGHT, THRESHOLD
sgn(x) : FUNCTION WITH SETTINGS-1 WHEN x < 0,
         0 WHEN x = 0, +1 WHEN x > 0

FIG. 11

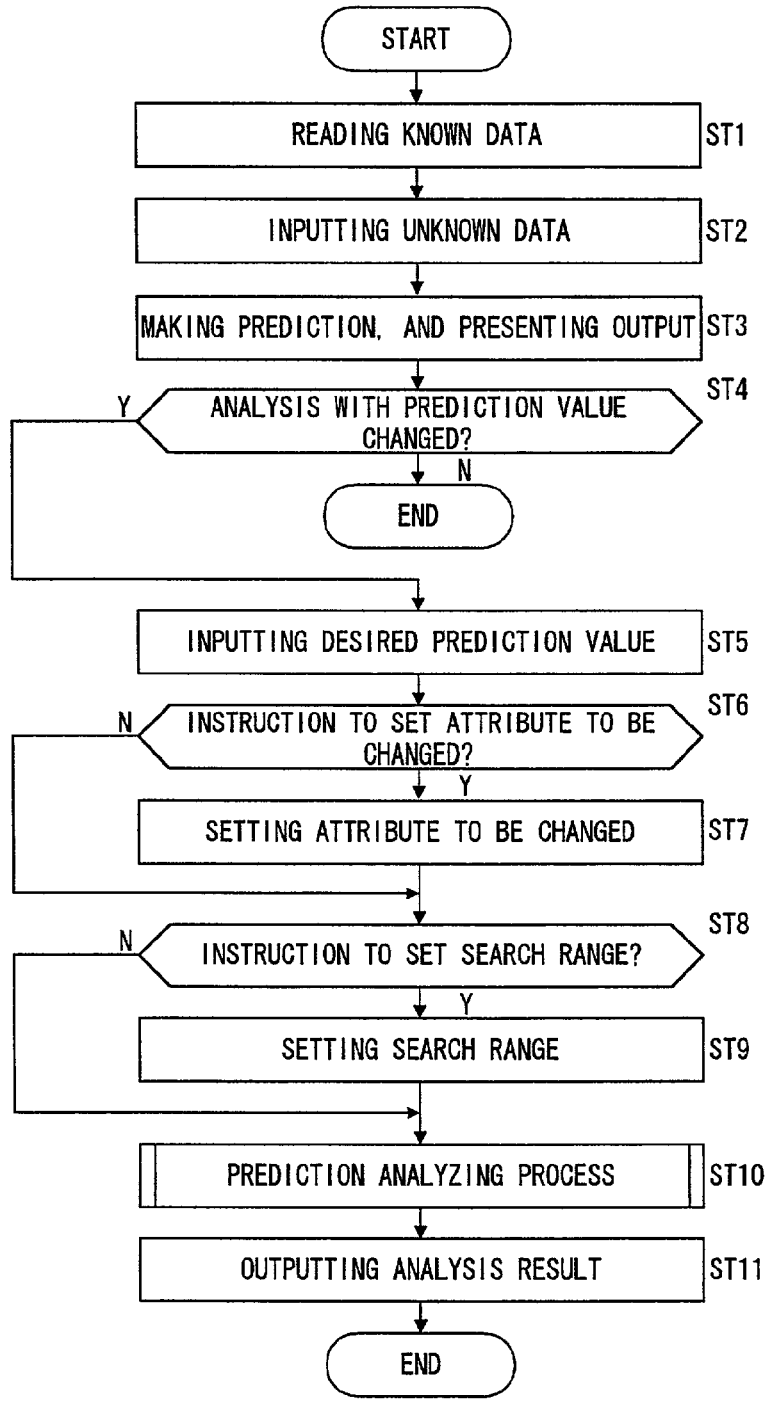
F I G. 1 3

FIG. 14A

| CHANGE MARK | CHANGE | FIXED | CHANGE | | |
|---|---|---|---|---|---|
| | TEMPERATURE 1 | TEMPERATURE 2 | PRESSURE | ... | RESULT |
| No. 101 | 13.8 | 8.9 | 1.9 | ... | ? |

FIG. 14B

| CHANGE MARK | CHANGE | FIXED | CHANGE | | |
|---|---|---|---|---|---|
| MAXIMUM VALUE | 20.0 | — | 2.5 | | |
| MINIMUM VALUE | 10.0 | — | 1.0 | | |
| | TEMPERATURE 1 | TEMPERATURE 2 | PRESSURE | ... | RESULT |
| No. 101 | 13.8 | 8.9 | 1.9 | ... | ? |

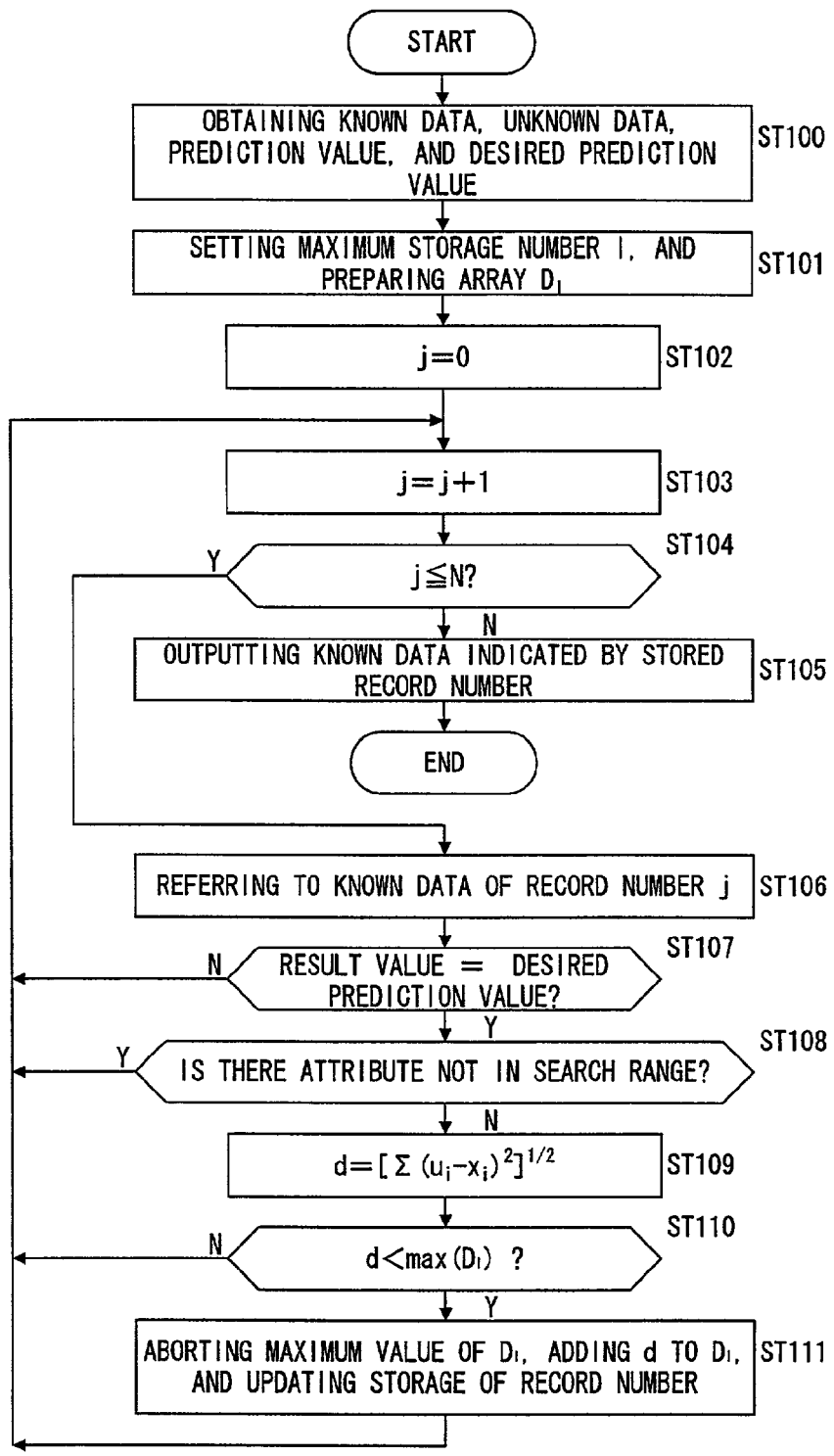
F I G. 15

$[A<15] \land [B \geq 1.4] \land [C \geq 10] \land [D \geq 3] \rightarrow$ NG
DESIRED PREDICTION VALUE = OK
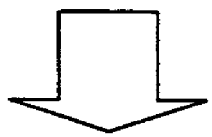
CHANGING RULE
$[A<15] \land [B \geq 1.4] \land [C \geq 10] \land [D<3] \rightarrow$ OK?
NOT DESIRED PREDICTION VALUE
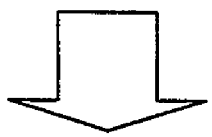
CHANGING RULE
$[A<15] \land [B \geq 1.4] \land [C<10] \rightarrow$ OK?
NOT DESIRED PREDICTION VALUE
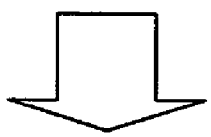
CHANGING RULE
$[A<15] \land [B<1.4] \rightarrow$ OK?
DESIRED PREDICTION VALUE
FIG. 20

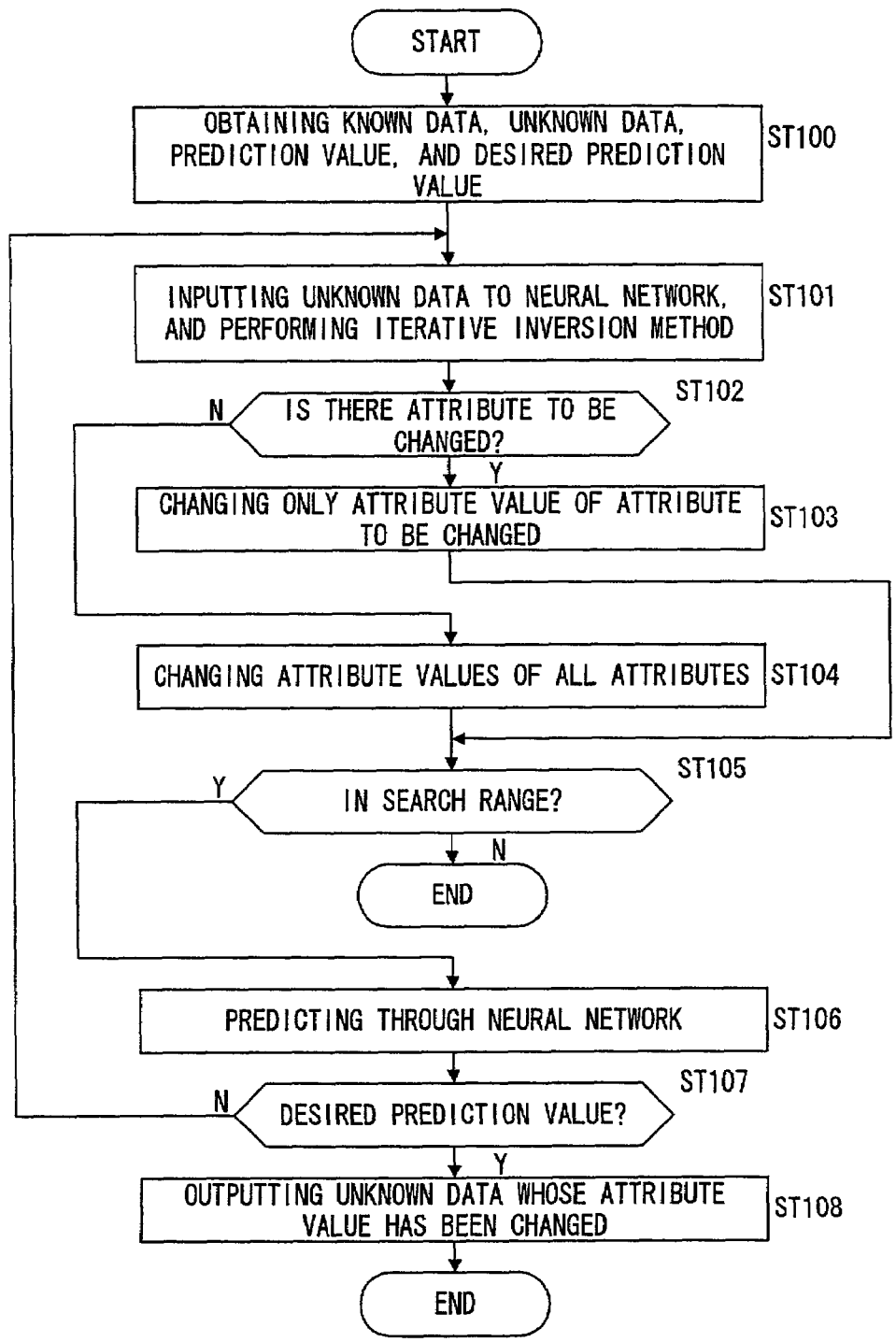
F I G. 2 1

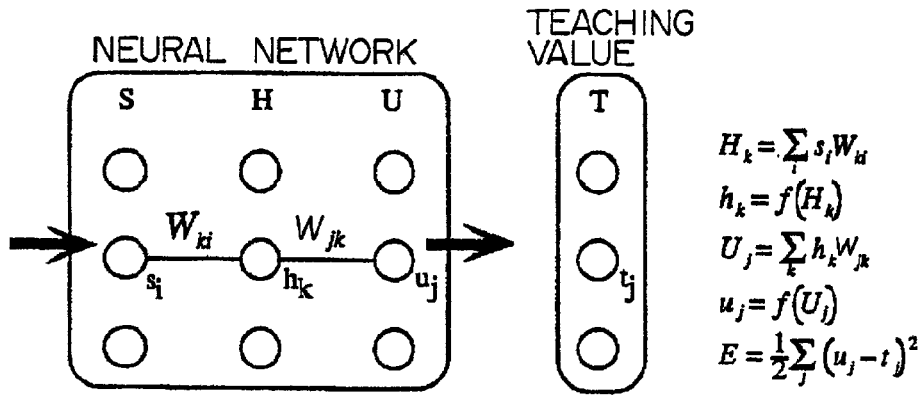

$$s_i \rightarrow s_i + \Delta s_i$$

$$\Delta s_i = \varepsilon\left[-\frac{\partial E}{\partial s_i}\right] = \varepsilon\left[\sum_j (t_j - u_j)\frac{\partial u_j}{\partial s_i}\right]$$

$$\frac{\partial u_j}{\partial s_i} = \frac{df(U_j)}{dU_j}\frac{\partial U_j}{\partial s_i}$$

$$= f'(U_j)\frac{\partial\left(\sum_k h_k W_{jk}\right)}{\partial s_i}$$

$$= f'(U_j)\sum_k W_{jk}\frac{\partial h_k}{\partial s_i}$$

$$= f'(U_j)\sum_k W_{jk}\frac{df(H_k)}{dH_k}\frac{\partial H_k}{\partial s_i}$$

$$= f'(U_j)\sum_k W_{jk}f'(H_k)W_{ki}$$

$$\Delta s_i = \varepsilon\left[\sum_j (t_j - u_j)f'(U_j)\sum_k W_{jk}f'(H_k)W_{ki}\right]$$

FIG. 22

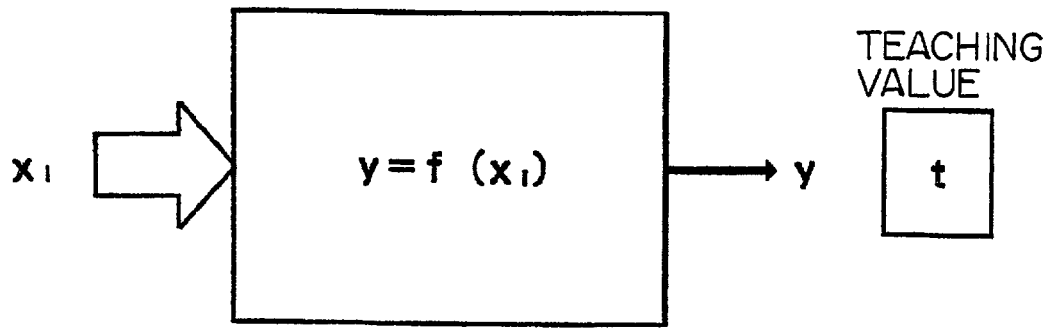

$$E = \frac{1}{2}(y-t)^2$$

$$y = f(x_i) = \sum_i A_i \cdot x_i$$

$$x_i \to x_i + \Delta x_i$$

$$\Delta x_i = \varepsilon\left[-\frac{\partial E}{\partial x_i}\right] = \varepsilon\left[(t-y) \cdot \frac{\partial y}{\partial x_i}\right]$$

$$\frac{\partial y}{\partial x_i} = \frac{\partial f(x_i)}{\partial x_i} = \frac{\partial \sum_i A_i \cdot x_i}{\partial x_i} = A_i$$

$$\therefore \Delta x_i = \varepsilon\left[(t-y) \cdot A_i\right]$$

FIG. 23

PREDICTION ANALYSIS APPARATUS AND PROGRAM STORAGE MEDIUM THEREFOR

BACKGROUND OF THE INVENTION

1. Field of the Invention

The present invention relates to a prediction analysis apparatus having the function of presenting a suggestion to change a prediction result into a desired result when predicting unknown data based on accumulated known data.

2. Description of the Related Art

Recently, with remarkable progress of computers and Internet, it has become possible to easily obtain a large volume of information of various types even from a remote source. In this connection, a high density and low price storage device can easily store the obtained information.

For example, in a POS (point of sale) system in the distribution business, the sales information from all branches in the world can be collected and stored in the computer of the head office, and is accumulated as the information about transaction items with time stamps. In addition, a large volume of information is accumulated in various fields such as the manufacturing industry storing the conditions of various production devices with yield data of produced goods, the financial business storing the data of the use of personal credit cards, the insurance business storing personal data and use data of policyholders, etc.

Under the situation, there is much demand for a method of automatically and efficiently extracting valuable information such as the relation of cause and effect, the rules, etc. obtained from the large volume of accumulated data, and making the best of the information in each business.

Conventionally, a result of unknown data has been predicted based on the accumulated known data through a statistic process, AI (artificial intelligence), a neural network, etc.

However, for practical use, it is requested not only to simply predict unknown data, but also to present an instruction as to what to do next based on the prediction result.

For example, if it is predicted that produced goods will be defective from the condition data (production condition) of various production devices in the manufacturing industry, it is important to check how the condition data should be changed to improve the goods to be produced. In the insurance business, it is important to check a possible risk according to the information about a policyholder and his or her status of use. For example, it is important to obtain the condition of a most suspicious person who can be predicted to be safe.

However, the conventional prediction apparatus has not presented a user with the information for suggestion as to how unknown data should be amended to change the obtained information, that is, the prediction result into a desired result. The conventional apparatus only predicts the level of sensitivity to the result of an attribute based on a sensitivity analysis. Thus, a demand for an apparatus capable of presenting the above mentioned information has grown.

SUMMARY OF THE INVENTION

The present invention aims at providing a prediction analysis apparatus capable of presenting the information for suggestion as to how unknown data should be amended to change a prediction result into a desired prediction value.

The prediction analysis apparatus according to the present invention includes: a prediction unit for predicting a result value corresponding to one or more attribute values of unknown data according to known data indicating the correspondence between one or more attribute values and corresponding result values; and an analysis unit for outputting analysis information indicating how to change the attribute values of the unknown data to change the result value predicted by the prediction unit into a desired prediction value.

By outputting the above mentioned analysis information, a user can more correctly determine how an attribute value of the unknown data should be changed to obtain a desired prediction value when a prediction result of the unknown data is not the desired prediction value. With a desired prediction value as a result value, any of the known data similar to the condition of unknown data, the attribute value of the unknown data for prediction of a desired prediction value as a result value, and the amount of change to the attribute value can be output as analysis information for a satisfactory effect.

When the analysis unit sets an attribute for which an attribute value should be changed in the attributes of the unknown data, and performs a process of obtaining analysis information by changing the attribute value of the set attribute, the user can obtain more effective and appropriate analysis information, thereby extending the application range for practical use.

In addition, when the analysis unit further sets a search range in which the attribute value of the set attribute to be changed can be actually changed, and performs a process of obtaining analysis information by changing the attribute value of the attribute set as an attribute to be changed in a corresponding search range, the user can obtain effective and appropriate analysis unit, thereby further extending the application range for more practical use.

It is desired that at least one of the attribute to be changed and the search range of the attribute can be set in an interactive mode. Furthermore, it is suggested that a program for realizing the above mentioned prediction analysis apparatus can be stored and distributed in a storage medium.

BRIEF DESCRIPTION OF THE DRAWINGS

FIG. 5A shows known data;

FIG. 5B unknown data;

FIGS. 9A through 9C show the contents of the operation performed in the back propagation method.

FIG. 11 shows the contents of the operation performed in the back propagation method in a growth control mode;

FIG. 13 is a flowchart of the entire process realized by performing an analysis program;

FIG. 14A shows the settings of the attribute whose attribute value is to be changed in the unknown data;

FIG. 14B shows the settings of the search range for the attribute set to be changed in the unknown data;

FIG. 15 is a flowchart (1) of a prediction analyzing process;

FIG. 20 shows the process of searching the rules to be observed when a result value of unknown data is changed into a desired prediction value;

FIG. 21 is a flowchart (5) of a prediction analyzing process;

FIG. 22 shows the contents of the operation performed when the condition of changing a result value of unknown data into a desired prediction value is searched for in the iterative inversion method; and FIG. 23 shows the contents of the operation performed when the condition of changing a result value of unknown data into a desired prediction value is searched for in the inverse computation method.

DESCRIPTION OF THE PREFERRED EMBODIMENTS

The embodiments of the present invention are described below in detail by referring to the attached drawings.

<First Embodiment>

Figure 1:
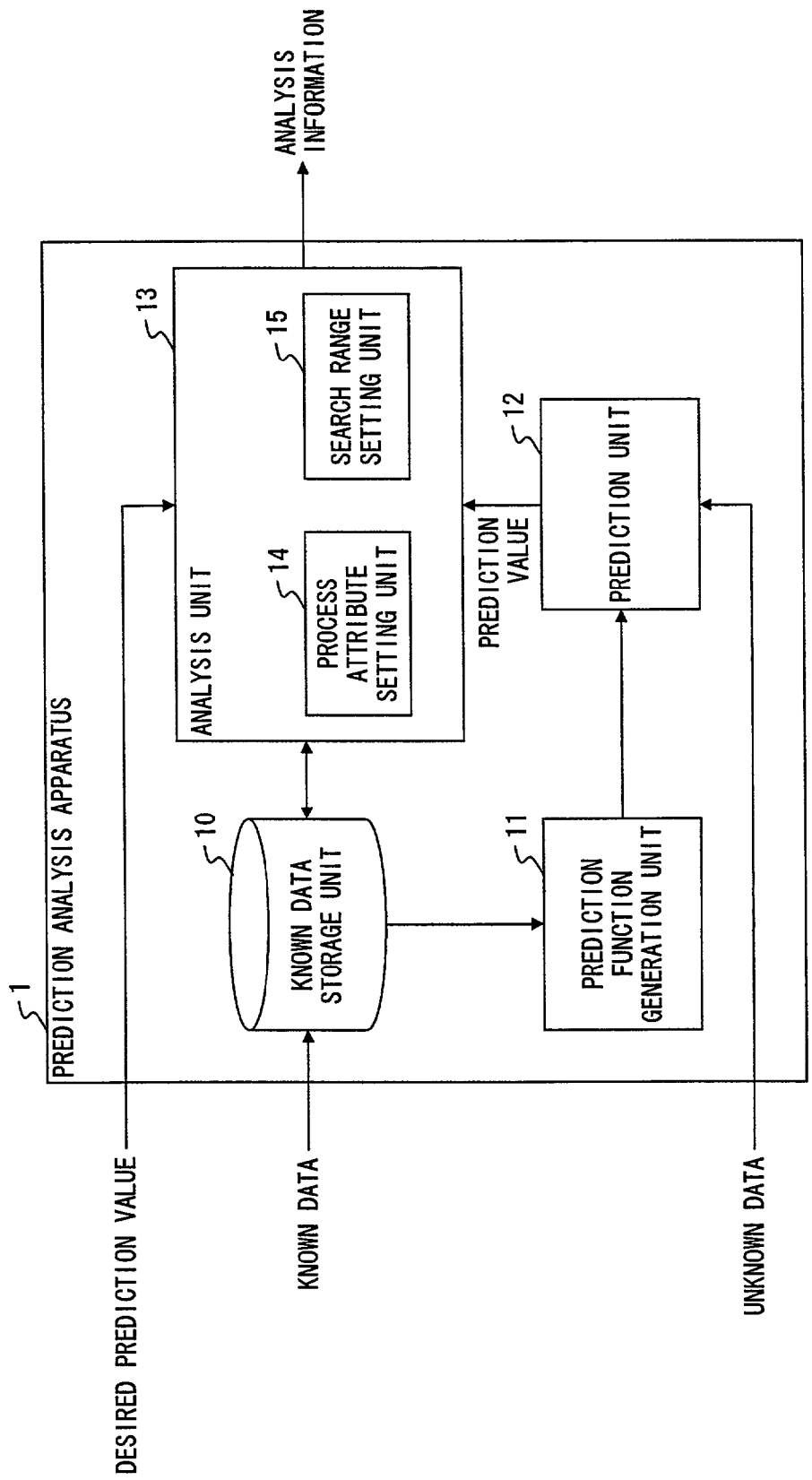
FIG. 1 shows the configuration of the prediction analysis apparatus according to the first embodiment of the present invention.

FIG. 1 shows the configuration of the prediction analysis apparatus according to the first embodiment of the present invention. In FIG. 1, a prediction analysis apparatus 1 performs the process of presenting the information by referring to which it is determined how to change a prediction result into a desired prediction value when unknown data is predicted based on the accumulated known data. To perform the process, the prediction analysis apparatus 1 comprises a known data storage unit 10, a prediction function generation unit 11, a prediction unit 12, and an analysis unit 13. A desired prediction value, unknown data, and known data are input from an input device or an external device connected to the prediction analysis apparatus 1.

The above mentioned known data is a prediction source. Normally, it refers to case data whose condition represented by one or more attribute values, and result value under the condition are known. Unknown data refers to data whose condition represented by one or more attribute values, and result value under the condition are unknown.

The known data storage unit 10 stores the above mentioned known data. The prediction function generation unit 11 extracts data necessary for the prediction unit 12 to make a prediction from the known data stored in the known data storage unit 10 based on the decision tree (for prediction of a result value of the unknown data by tracing the conditional branch of each node) shown in FIG. 2, the rules (for prediction of a result value of the unknown data by performing a matching check on each rule) shown in FIG. 3, equations represented by, for example, '$Y = \Sigma A_i \times X_i$ ($X_i$ indicates an attribute value, $A_i$ indicates a coefficient, and Y indicates a result value)', MBR (memory-based reasoning), or a neural network. The prediction unit 12 predicts a result value corresponding to the attribute value of the unknown data using the data extracted by the prediction function generation unit 11.

The analysis unit 13 does an analysis by referring to the unknown data and the data extracted by the prediction function generation unit 11 when the prediction result of the prediction unit 12 is different from a user-desired prediction value, and generates and presents (outputs) the analysis information indicating how an attribute value of the unknown data should be amended to change the prediction result into a desired prediction value. The analysis information can be presented by displaying it on the display device connected to the prediction analysis apparatus 1, or transmitting it to an external device connected to the prediction analysis apparatus 1.

The analysis unit 13 comprises a process attribute setting unit 14 for setting an attribute whose value is to be changed in the attributes of the unknown data. The process attribute setting unit 14 either sets an attribute to be changed in an interactive mode, or automatically set the attribute to be changed based on the importance factor (the influence factor of each attribute obtained from the MBR on a prediction result, the network weight obtained by the learning of a structured neural network, etc.) of each attribute computed from the known data. By providing the process attribute setting unit 14, analysis information obtained by changing the value of an attribute having a higher importance factor, or analysis information obtained by removing the attribute whose value cannot be changed is removed from attributes to be changed can be output. By providing the process attribute setting unit 14, the application range can be extended for more practical use, and more appropriate analysis information can be obtained.

The analysis unit 13 comprises a search range setting unit 15 for setting the search range of the value of an attribute to be changed. The search range setting unit 15 obtains analysis information effective in a significant search range. By providing the search range setting unit 15, an application range can be extended for more practical use.

The function of each of the above mentioned units 10 through 15 can be practically realized by a program. That is, the CPU provided in a computer executes the program using a storage device, etc. such as RAM, a hard disk device, etc. The program can be stored in semiconductor memory such as computer-readable ROM, a hard disk of a hard disk device, etc., and also can be stored and distributed in a storage medium such as CD-ROM, a floppy disk, a magnet-optical disk, etc. Thus, a storage medium can be accessed by a device for distributing a program.

When a prediction result of the unknown data predicted by the prediction unit 12 through the MBR, the neural network, etc. is different from a desired prediction value, the analysis unit 13 holds a user-desired prediction value as a result value in the known data stored in the known data storage unit 10, and specifies one of more pieces of known data having attribute values similar to the attribute values of the unknown data. The specified known data is presented to the user as analysis information. Plural pieces of known data can be specified, known data having an average value of the attribute values of the known data or the attribute value having the largest occurrence number is generated, and the generated known data can be presented to the user.

The known data can be specified with the importance factor of each attribute taken into account. In the MBR, the influence factor of each attribute value on a result value is considered. In the neural network, the weight of a network obtained from the learning of a structured neural network is considered.

If the prediction result of the unknown data predicted by the prediction unit 12 is not desired by the user, then the known data similar to the unknown data having a user-desired prediction value as a result value is presented. Thus, the user can be informed how the attribute value of the unknown data can be amended to change the prediction result into a desired prediction value.

When the prediction result of the unknown data predicted by the prediction unit 12 is not desired by the user, the analysis unit 13 can compute the attribute value to be assigned to the unknown data to obtain a desired prediction value by learning the difference between the prediction value of the unknown data and the desired prediction value in the back propagation method using the data conversion function (a neural network, a function, etc.) for computation of the result value of the known data, and can present the attribute whose value is to be changed, and the value (or the amount of a change to the attribute value) as analysis information to the user. According to the presented analysis information, the user can be informed how an attribute value should be amended to change the prediction result into a desired prediction value.

When the prediction result of the unknown data predicted by the prediction unit 12 is not desired by the user, the analysis unit 13 refers to the algorithm (a decision tree, rules, etc.) for obtaining a result value of the known data, extracts the algorithm to be considered (a path of the decision tree, a rule, etc.) to have the unknown data holding a desired prediction value as a result value from among the algorithms, and presents the algorithm or the known data which can hold a desired prediction value as a result value through the algorithm as analysis information to the user. According to the presented analysis information, the user can be informed how an attribute value should be amended to change the prediction result into a desired prediction value. There can be plural pieces of known data to be presented as analysis information to the user, and each attribute value can be an average value, or the value having the largest occurrence number.

As described above, the user can be informed how an attribute of the unknown data should be changed to obtain a desired prediction value as a prediction result from any of the above mentioned analysis information presented to the user. A certainty factor indicating the value of a certainty level can also be presented in combination with the analysis information.

The known data is not directly used in predicting a result value in the method performed using a neural network, a function, a decision tree, a rule, etc. Therefore, when the prediction unit 12 predicts a result value in the method, the prediction analysis apparatus 1 can be set such that it cannot store the known data.

<Second Embodiment>

Figure 4:
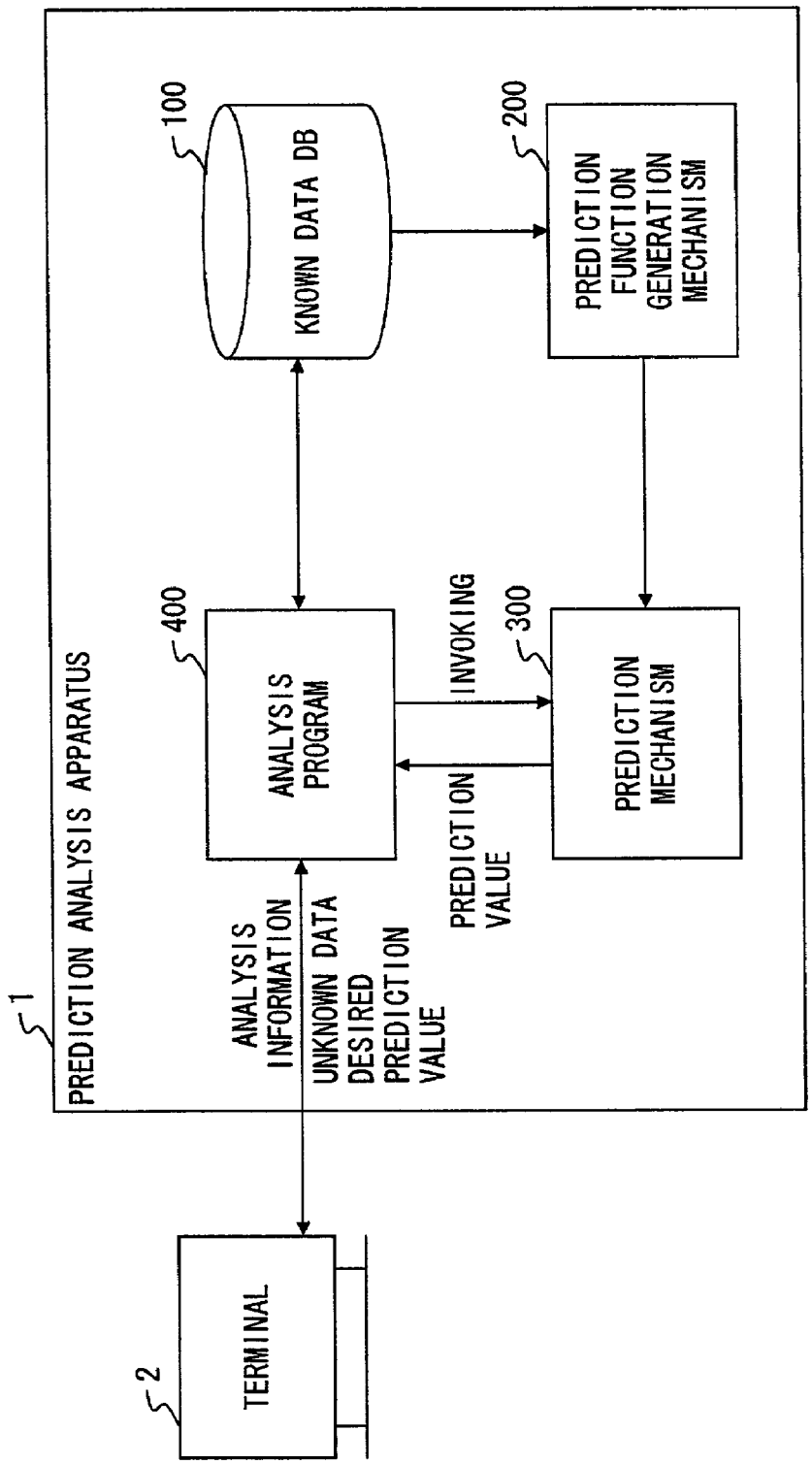
FIG. 4 shows the configuration of the prediction analysis apparatus according to the second embodiment of the present invention.

FIG. 4 shows the configuration of the prediction analysis apparatus 1 according to the second embodiment of the present invention.

The prediction analysis apparatus 1 is connected to a terminal 2 as shown in FIG. 4, and comprises a known data database (DB) 100, a prediction function generation mechanism 200, a prediction mechanism 300, and an analysis program 400.

The known data DB 100 is configured on a hard disk provided in a hard disk device mounted in the prediction analysis apparatus (for example, a computer) 1, and accumulates and stores known data. The known data is a prediction source. Normally, it refers to case data whose condition represented by one or more attribute values, and result value under the condition are known. Unknown data refers to data whose condition represented by one or more attribute values, and result value under the condition are unknown.

The prediction function generation mechanism 200 provides data required for prediction in the known data stored in the known data DB 100 to the prediction mechanism 300. The prediction mechanism 300 predicts unknown data using the known data obtained from the prediction function generation mechanism 200. The prediction function generation mechanism 200 and the prediction mechanism 300 can be realized by the CPU of the apparatus 1 executing a program stored in a hard disk using hardware such as RAM, a hard disk, etc.

The analysis program 400 is stored in the hard disk mounted in the prediction analysis apparatus 1. When the CPU mounted in the apparatus 1 reads the analysis program 400 stored in the hard disk, and executes the program, the function specific to the present invention is realized. The analysis program 400 can be executed not after being stored in a hard disk, but after being read from CD-ROM, DVD, and a storage medium such as a magnet-optical disk, etc. Otherwise, it can be received from an external device through a transmission medium used in a LAN, a public network, etc.

FIG. 5A shows an example of known data. It shows the contents of the known data about the condition under which an acceptable product is generated, and the condition under which a defective product is generated when a product such as a semiconductor chip, etc. is produced. In FIG. 5A, a result value is represented in binary of OK and NG. The result value can be discrete multivalues of serial numbers in a given range such from 0 to 1, etc.

According to the second embodiment of the present invention, if the unknown data whose result value is unknown as shown in FIG. 5B is input through the terminal 2 when the known data DB 100 accumulates and stores the known data, a prediction is made for the result value (value in the result field). When the result value is different from a desired prediction value, an analysis is performed by referring to the unknown data and the known data stored in the known data DB 100, analysis information indicating how an attribute value of the unknown data should be amended to change the prediction result into a desired prediction value is generated, and is output to the terminal 2.

Figures 2, 3:
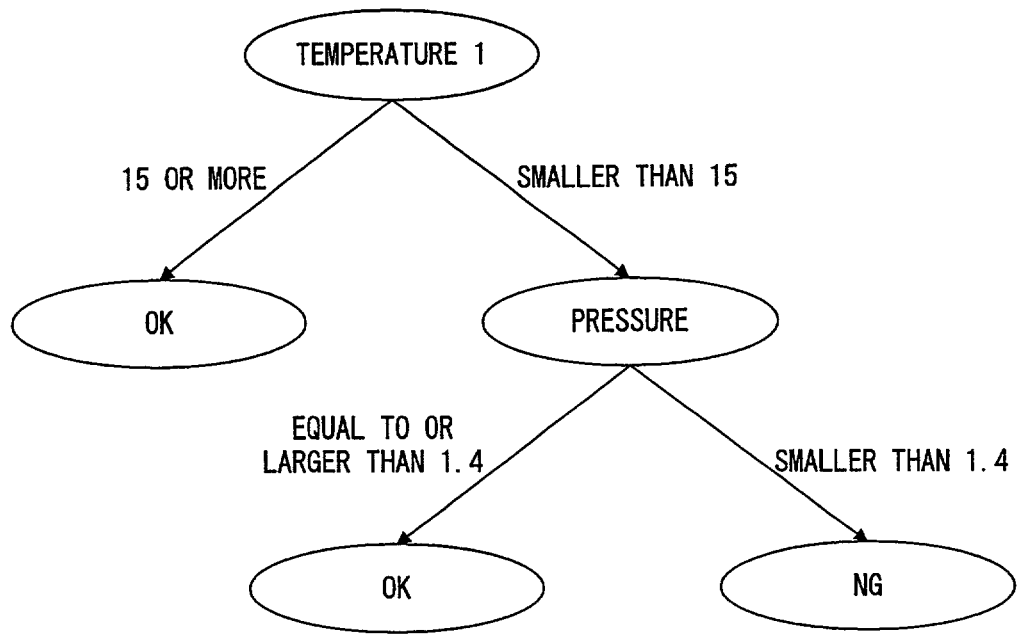
FIG. 2 shows a decision tree.
FIG. 3 shows the rules.

The analysis program 400 directs the prediction mechanism 300 to predict the result value of the unknown data. According to the information provided by the prediction function generation mechanism 200, the prediction mechanism 300 predicts a result value based on the decision tree as shown in FIG. 2, the rule as shown in FIG. 3, the equation '$Y = \Sigma A_i \times X_i$ ($X_i$ indicates an attribute value, $A_i$ indicates a coefficient, and Y indicates a result value)', MBR (memory-based reasoning), or a neural network. The method of predicting a result value is described below.

Figure 6:
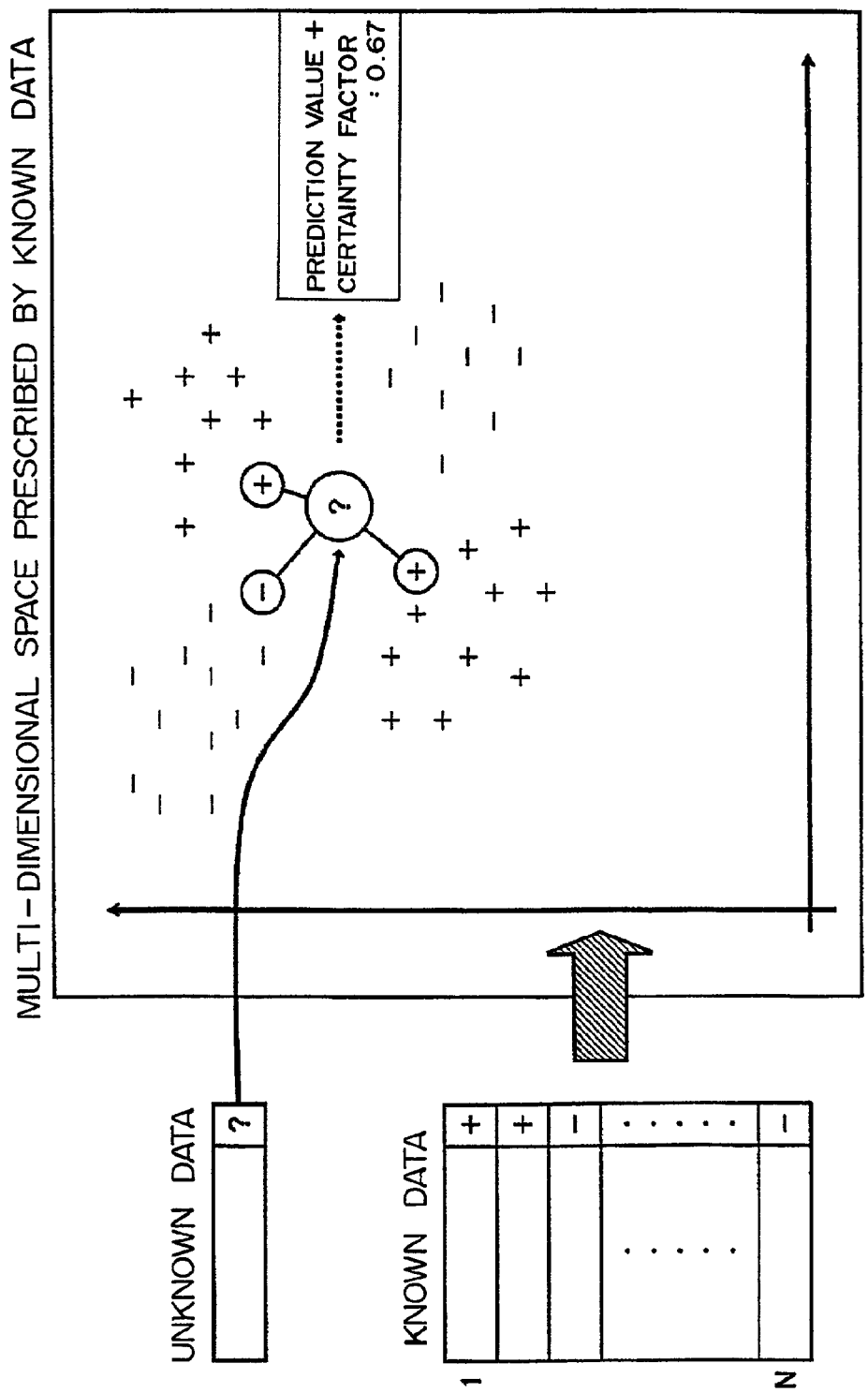
FIG. 6 shows the method of predicting a result value of unknown data by an MBR (memory-based reasoning)

In the above mentioned MBR, as shown in FIG. 6, a multi-dimensional space formed by the attributes of the known data and the unknown data are considered. The influence factor of each attribute on a result value is computed by statistically processing the known data. By referring to the influence factor, the similarity between the unknown data and the known data in a multi-dimensional space is computed. When the similarity is computed, a predetermined number of pieces of known data is extracted in order from the highest similarity, and the certainty factor (a value defined for each class of result value, for example, a value for the result value of OK, a value for the result value of NG, etc.) indicated by the result value is computed for each piece of the extracted known data. The result value having the largest certainty factor in the obtained certainty factors is predicted as a result value of the unknown data. Otherwise, from the result values of the predetermined number of pieces of the extracted known data, a weighted sum is obtained, and a result value of the unknown data is determined.

At present, various methods are suggested as the methods of computing the influence factor, the similarity, and the certainty factor of each attribute. For them, or one of them, the computing method filed by the Applicant of the present invention and disclosed by the gazette of Japanese Patent Application No.2000-155681 can be adopted.

Figure 7:
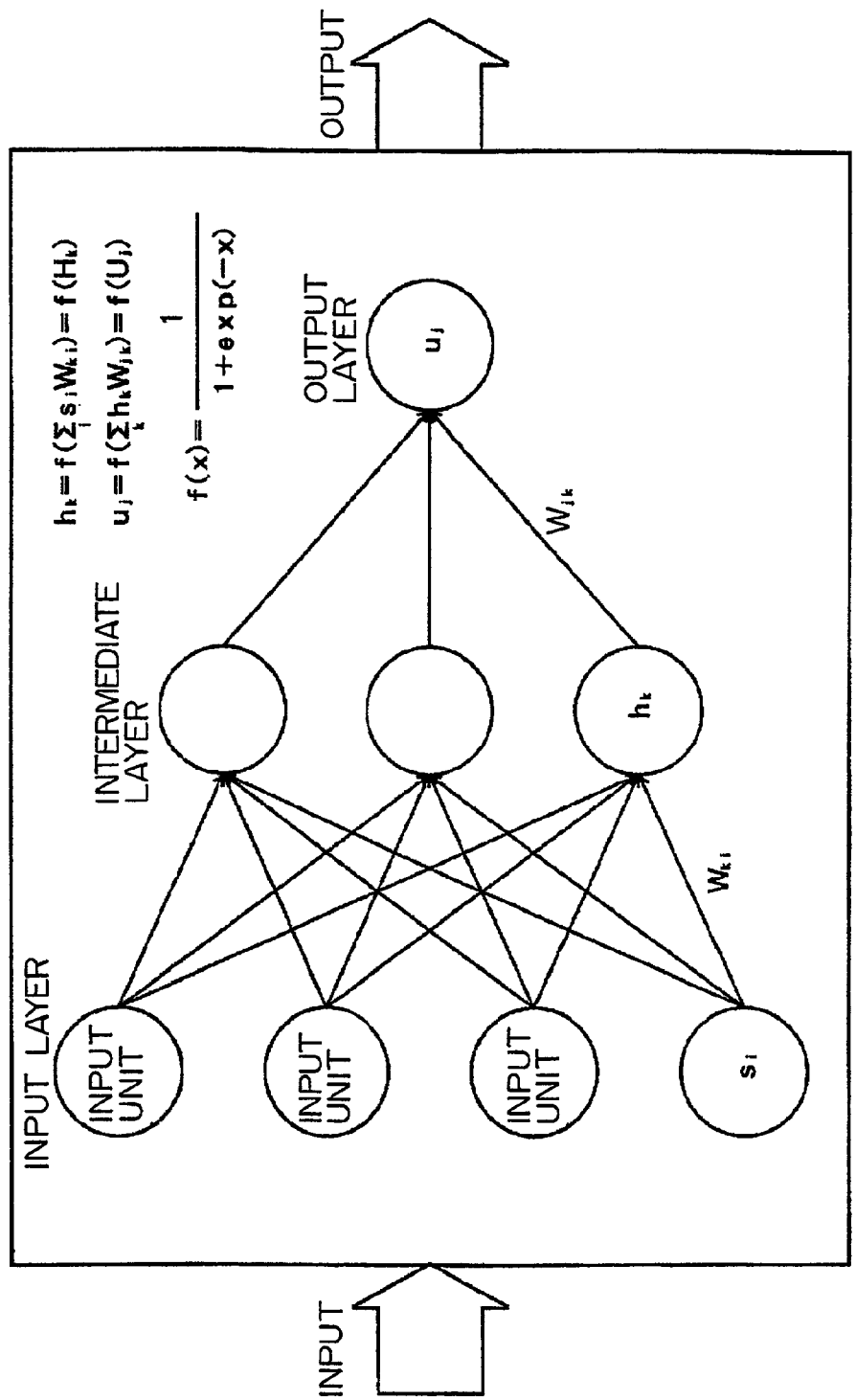
FIG. 7 shows a neural network.

In a neural network, a multi-layer network is formed as shown in FIG. 7. Data is input from an input layer, and output from an output layer through an intermediate layer (hidden layer).

The network weight assigned to the coupling between layers, and the threshold of each unit of the intermediate and output layers are optimized in, for example, the back propagation method using the known data as learning data. By performing the learning, the attribute value of the unknown data is input to the input layer, and a predicted result value is output from the output layer.

Figure 8:
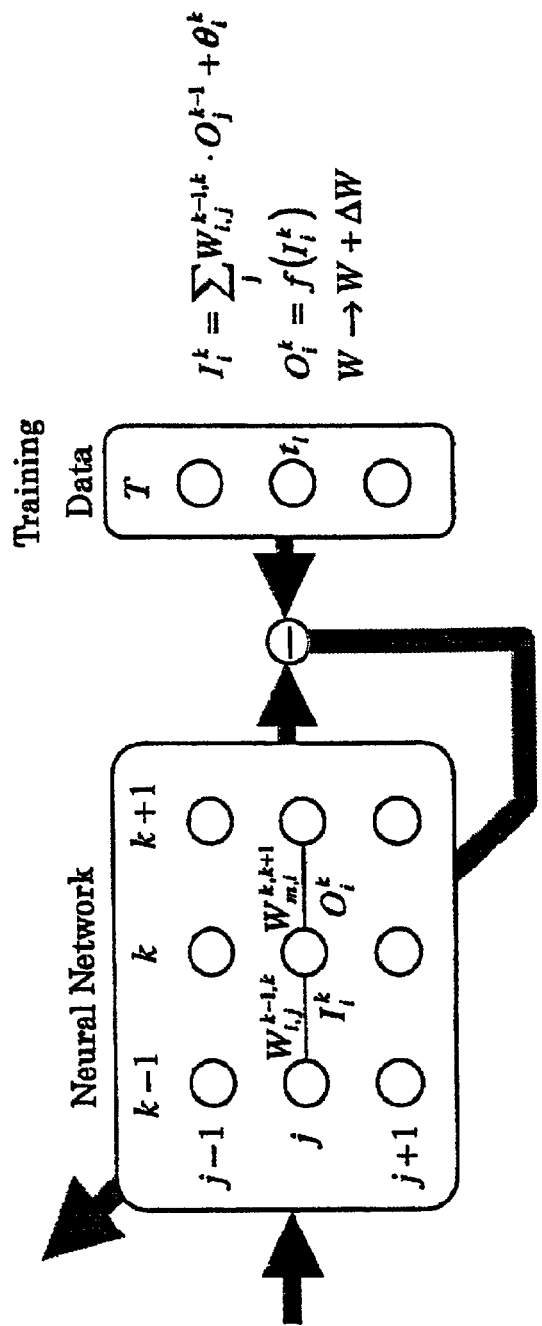
FIG. 8 shows a back propagation method.
Figure 10:
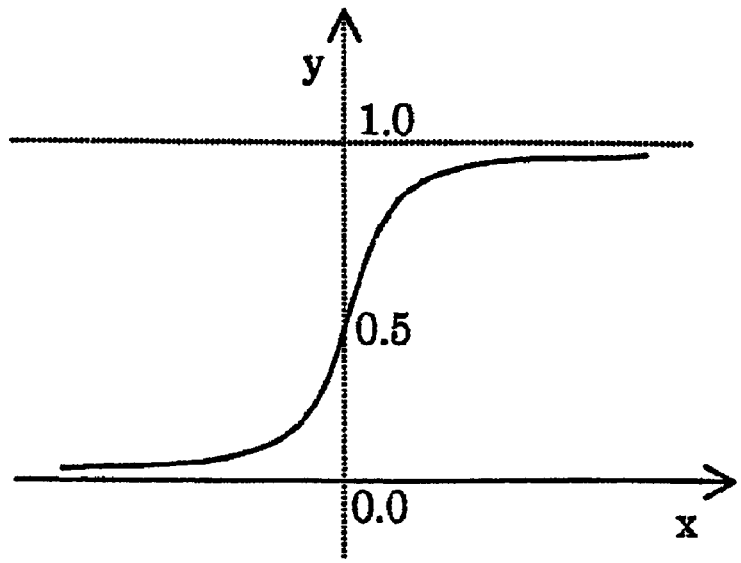
FIG. 10 shows the contents of the operation performed in the back propagation method when a sigmoid function is used.

In the back propagation method, the operations as shown in FIGS. 8 through 10 are performed. As shown in FIG. 9C, using the previous changes as inertial items in the operations prevents the values of changes in the weight and the threshold from fluctuating. FIG. 10 shows the contents of the operations performed using a sigmoid function.

As an example of a variation of the back propagation method, a learning operation is performed by reflecting a growth control item S in computing the weight and the threshold as shown in FIG. 11. In the back propagation method of the growth control model, the growth with a large weight is promoted, but the growth with a small weight is suppressed into degeneracy. As a result, as shown in 12, only an internal coupling having a large weight remains, thereby generating a structured neural network.

Figure 12:
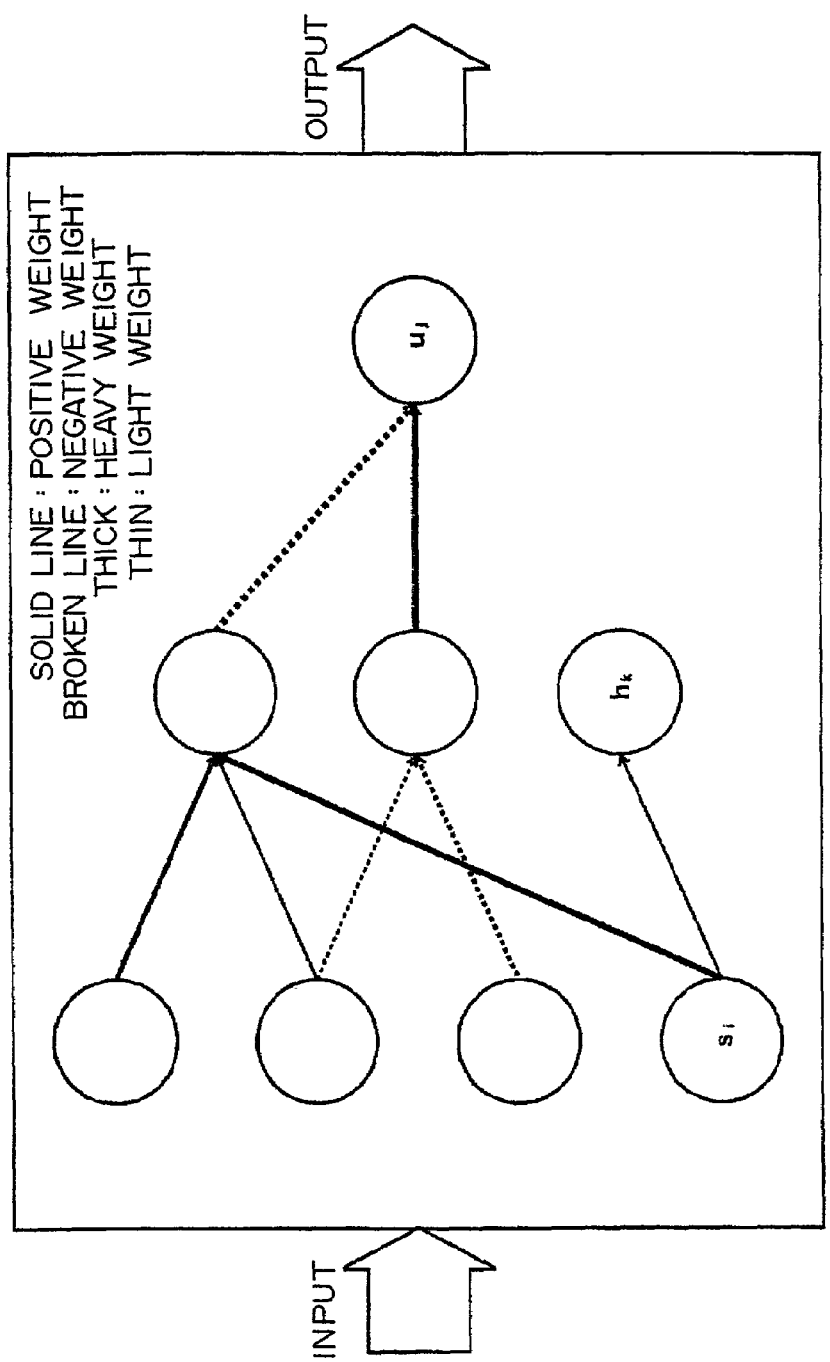
FIG. 12 shows a structured neural network.

In the structured neural network shown in FIG. 12, the internal coupling having the weight of a small absolute value is not displayed. A solid line indicates an internal coupling having the weight of a positive value, and a broken line indicates an internal coupling having the weight of a negative value. The thickness of the line is proportional to the absolute value of the weight.

In the normal back propagation method, since the learned weight is complicatedly associated with other values, it is difficult to understand which attribute has much influence on a result value. On the other hand, in the back propagation method of a growth control model, the learning operation simplifies the internal coupling. Therefore, it is easily understood what attribute has much influence on a result value.

FIG. 13 is a flowchart of the entire process performed by the analysis program 400. The flow can be realized by the CPU mounted in the prediction analysis apparatus 1 reading the analysis program 400 from, for example, a hard disk for execution.

When the analysis program 400 is activated, the known data is first read from the known data DB 100 in step 1. Then, in step 2, the unknown data to be analyzed is input from the terminal 2, etc. After inputting the unknown data, control is passed to step 3.

In step 3, the prediction mechanism 300 is allowed to predict a result value using the input unknown data as a prediction target, and to output the prediction result to the terminal 2, thereby presenting the prediction result to the user.

The prediction mechanism 300 predicts a result value as follows. Described below is each method available in the prediction.

First, when the prediction mechanism 300 makes a prediction based on the decision tree as shown in FIG. 2, a result value of the unknown data can be predicted by tracing a conditional branch in each node forming part of the decision tree up to a leaf node depending on the attribute value of the unknown data.

When the prediction mechanism 300 makes a prediction based on the rules as shown in FIG. 3, the result value of the unknown data can be predicted by checking the combination of the attributes of the unknown data and each attribute value by comparing them with each rule.

When the prediction mechanism 300 makes a prediction using the equation represented by '$Y = \Sigma A_i \times X_i$ ($X_i$ indicates an attribute value, $A_i$ indicates a coefficient, and Y indicates a result value)', the result value of the unknown data can be predicted by substituting the attribute value of the unknown data for the equation.

When the prediction mechanism 300 makes a prediction by the MBR as described above by referring to FIG. 6, the influence factor of each attribute is first considered, the similarity between the unknown data and each piece of the known data is computed, a predetermined number of pieces of known data similar to the unknown data are extracted from the known data based on the computed similarity, the weighted sum of the result values of the extracted known data is obtained, thereby predicting the result value of the unknown data.

When the prediction mechanism 300 makes a prediction through the neural network as shown in FIG. 7 or 12, the attribute value of the unknown data is input to the neural network, and the value output as a reply of the input is obtained as a result value of the unknown data.

As described above, after the prediction mechanism 300 outputs the predicted result value through the terminal 2, control is passed to step 4, and the prediction mechanism 300 determines whether or not a request has been received from the terminal 2 to do an analysis after changing the prediction value in response to the output of the result value. If the user of the terminal 2 has issued the request, then the determination is YES, and control is passed to step 5. Otherwise, the determination is NO, thereby terminating the series of processes.

In step 5, the terminal 2 inputs a user-desired prediction value. For example, if NG is output to the terminal 2 as a prediction result of either OK or NG, the user intends to know how the prediction result of OK can be obtained. In this case, the user specifies OK as a user-desired prediction value which is input through the terminal 2.

In step 6 after step 5, it is determined whether or not the user of the terminal 2 has issued an instruction to set an attribute to be changed. If the instruction is issued, then the determination is YES, control is passed to step 7, the attribute specified to be changed (processed) is set as an attribute to be changed, and control is passed to step 8. Otherwise, the determination is NO, and control is passed to step 8.

The analysis program 400 realizes the process of indicating how to change the attribute value of the unknown data by computing an attribute value required to make an amendment to change the result value of the unknown data into a user-desired prediction value, or retrieving the known data similar to the unknown data and having a desired prediction value.

To perform the process, the analysis program 400 processes as an attribute to be changed (processed) only the attribute set by the user as an attribute to be changed. As a result, an actually applicable range can be extended by excluding insignificant attribute or an attribute whose value cannot be changed from those to be processed. To attain this, the process of setting an attribute to be changed (processed) is performed in step 7.

In the setting process, as shown in FIG. 14A, the attribute 'temperature 1' is set to be processed as an attribute to be changed (processed), and the attribute 'temperature 2' is set not to be processed as an attribute to be changed (processed) The settings are input in an interactive mode with the user. The attributes can also be set not in the interactive mode, but using a MBR or a structured neural network such that an attribute to be changed (processed) can be automatically set.

An attribute can be automatically set using the MBR by referring to the influence factor (computed by statistically processing the known data as a value indicating the influence factor on a prediction result) of each attribute obtained by the MBR, for example, by excluding attributes in order from the attribute having the smallest influence which is equal to or smaller than $\frac{1}{100}$ of the attribute having the largest influence on a prediction result from the attributes to be changed (processed). The statistic method used in computing the influence factor can be a PCF (per-category feature importance) method, a CCF (cross-category feature importance) method, an ACF (average category feature) method, the method filed by the Applicant of the present invention and disclosed by the gazette of Japanese Patent Application No.2000-155681, etc.

The automatic setting process using a structured neural network as shown in FIG. 12 can be performed by computing a sum of absolute values of the weight set between the units in the hidden layers coupled with each of the units (units provided corresponding to the attributes) forming, for example, an input layer, and excluding from the attributes to be changed (processed) the attributes whose values are input to the input units having a sum equal to or smaller than $\frac{1}{100}$ of the largest sum as having a very small influence on a prediction result.

As described above, in step 8 to which control is passed after setting an attribute to be changed, it is determined whether or not the user of the terminal 2 has issued an instruction to set a search range for an attribute to be changed. If the instruction is issued, the determination is YES, control is passed to step 9, the search range of an attribute to be changed is set according to the instruction, and control is passed to step 10. Otherwise, the determination is NO, and control is passed to step 10.

The above mentioned search range is set with the value of the attribute within the set range not changed into a value outside the set range, thereby extending the actually applicable range.

Therefore, in the setting process performed in step 9, as shown in FIG. 14B, the attribute which can be assigned a serial number such as the attribute 'temperature 1' has the maximum value of 20.0, and the minimum value of 10.0, that is, has a search range set by upper and lower limits. An attribute whose attribute value is a category value has a search range set by specifying a possible category value. Since the attribute 'temperature 2' is not set as an attribute to be changed, it is not defined as an attribute for which a search range is set. Such a search range is set in an interactive mode with the user. The search range can be represented, for example, as follows.

$$f = \epsilon - \Sigma(u_i - x_i)^2$$

where $\epsilon$ indicates the maximum allowance, i indicates an attribute number, $u_i$ indicates unknown data, $x_i$ indicates known data. In this evaluation equation, if the evaluation value is equal to or larger than 0, then the search continues. If it is smaller than 0, the search terminates. Thus, the restriction is automatically set. If the restriction is automatically placed, the evaluation equation is appropriately selected to set a search range.

After setting a search range in step 9 as described above, control is passed to step 10. In step 10, a prediction analyzing process is performed to know how to change the attribute value of the unknown data to obtain a user-desired prediction value. In step 11, an analysis result (analysis information) obtained by performing a prediction analyzing process it output to the terminal 2. Then, a series of processes are terminated.

In the prediction analyzing process in step 10, the process corresponding to the method adopted by the prediction mechanism 300 shown in FIG. 4 is performed to predict a result value of the unknown data. Described below in detail for each method is the prediction analyzing process performed in step 10.

FIG. 15 is a flowchart of the prediction analyzing process performed in step 10. The prediction analyzing process is performed based on the prediction of a result value of the unknown data made by the prediction mechanism 300 using an equation, MBR, neural network, etc.

First, in step 100, the known data read from the known data DB 100, the unknown data input from the terminal 2 to be analyzed, a prediction value (predicted result value) of the unknown data obtained by the prediction mechanism 300, and the user-desired prediction value are obtained.

Then, in step 101, the maximum storage number I is set, and an array $D_I$ for storing the data for the maximum storage number I is prepared. In step 102, 0 is substituted for the variable j. Then, after incrementing the value of the variable j in step 103, control is passed to step 104.

In step 104, it is determined whether or not the number N of pieces of the known data is equal to or larger than the value of the variable j. If the number N is smaller than the value of the variable j, the determination is NO, control is passed to step 105, and the known data indicated by the record number stored in the element of the array $D_I$ is output as a result (analysis result) of the prediction analyzing process, thereby terminating a series of processes. Otherwise, the determination is YES, thereby passing control to step 106.

In step 105, instead of outputting a list of the known data whose record number is stored in the element of the array $D_I$, the known data closest to (most similar to) the unknown data can be represented and output. Otherwise, the known data obtained by performing a predetermined arithmetic operation on the known data can be represented and output. The arithmetic operation refers to a process of computing the average value for a value attribute, and obtaining a majority decision for a category attribute.

In step 106, the known data having the value of the variable j as a record number is referred to. Then, in step 107, it is determined whether or not the result value of the known data matches the desired prediction value of the unknown data. If they do not match each other, the determination is NO, and control is returned to step 103 to process the next known data. Otherwise, the determination is YES, thereby passing control to step 108.

In step 108, it is determined whether or not there is any attribute value not contained in the search range in the attribute values of the referenced known data. If the known data has an attribute value not contained in the search range set by the user of the terminal 2, then the determination is YES, and control is returned to step 103 to process the next known data. Otherwise, the determination is NO, thereby passing control to step 109.

In step 109, the distance d between the known data referred to in step 106 and the unknown data is computed. After computing the distance d, control is passed to step 110. The distance d can be computed as follows.

$$d=[\Sigma(u_i-x_i)^2]^{1/2}$$

where $u_i$ indicates the attribute value of the unknown data, and $x_i$ indicates the attribute value of the known data.

When an attribute to be changed is set in step 7 shown in FIG. 13, the distance d is computed by excluding an attribute not set as an attribute to be changed. An attribute represented by a number, for example, the value area is divided into a plurality of portions, a category value is assigned to each portion, and the distance d is computed with each value converted into a category value. The distance d can also be computed in the method filed by the Applicant of the present invention and described in the gazette of Japanese patent application No.2000-155681.

In step 110 to which control is passed after computing the distance d, it is determined whether or not the distance d is smaller than the largest value of the distance d stored in the element of the array $D_I$. If there is any known data storing the distance d in the element of the array $D_I$ which is not similar to the unknown data as compared with the known data for which the distance d has been computed, then the determination is YES, control is passed to step 111, the computed distance d and the value of the variable j are stored in the element of the array $D_I$ storing the maximum distance d, and control is returned to step 103. Otherwise, the determination is NO, and control is returned to step 103.

The analysis program 400 realizes the prediction analyzing process having the above mentioned contents. Thus, the maximum of I pieces of known data having a desired prediction value as a result value and similar to the unknown data are specified as an analysis result.

Figure 16:
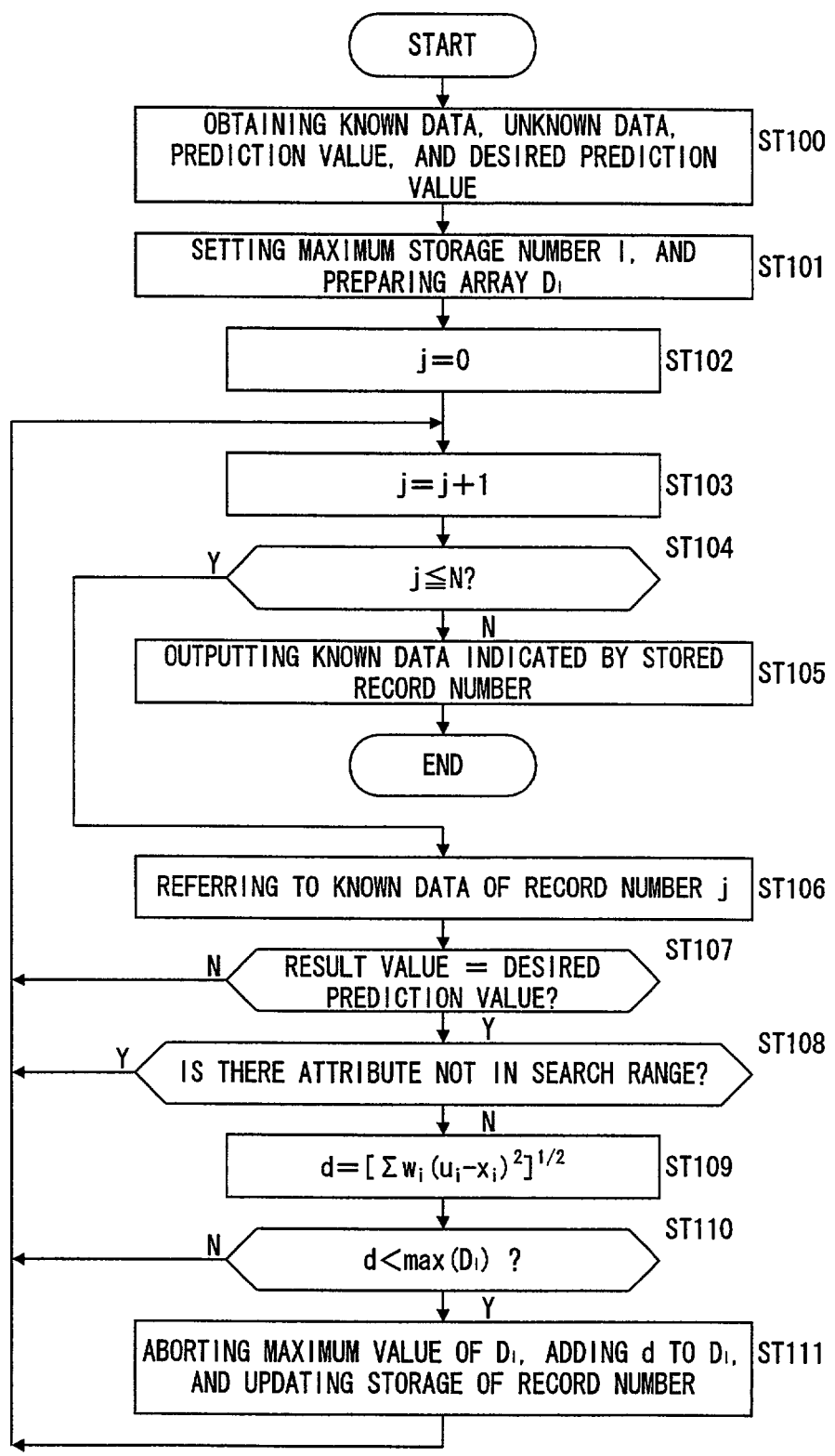
FIG. 16 is a flowchart (2) of a prediction analyzing process.

In the prediction analyzing process shown in FIG. 15, the distance d is computed without considering the importance of an attribute in step 109. The importance can also be considered in step 109 with the contents as shown in FIG. 16. In step 109 shown in FIG. 16, the distance d is computed as follows with the influence factor $w_i$ of each attribute obtained in the MBR taken into account.

$$d=[\Sigma w_i(u_i-x_i)^2]^{1/2}$$

The influence factor $w_i$ can be a network weight of each attribute obtained in the structured neural network.

Figure 17:
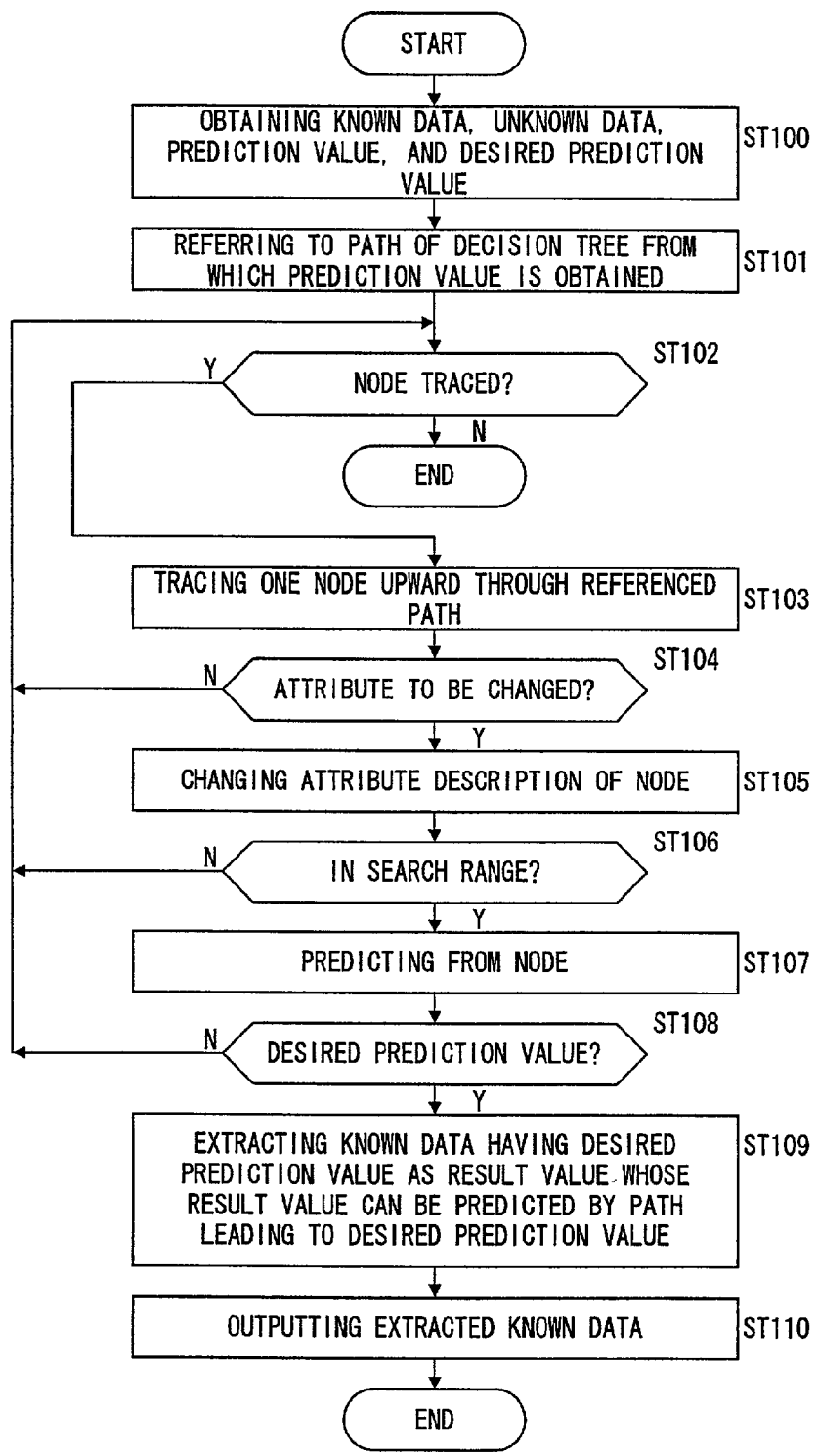
FIG. 17 is a flowchart (3) of a prediction analyzing process.

Described below in detail by referring to the flowchart shown in FIG. 17 is the prediction analyzing process performed when a result value of the unknown data is predicted by the prediction mechanism 300 using a decision tree as shown in FIG. 2.

First, in step 100, the known data read from the known data DB 100, the unknown data input from the terminal 2 to be analyzed, a prediction value (predicted result value) of the unknown data obtained by the prediction mechanism 300, and the user-desired prediction value are obtained.

Next, in step 101, the path of the decision tree through which a prediction value of the unknown data has been obtained is referenced. Then, in step 102, it is determined whether or not the node of the path can be traced one level upward. If there is no node positioned above the current node, the determination is NO, and a series of processes terminate. Otherwise, that is, there is a node above the current node, the determination is YES, thereby passing control to step 103.

In step 103, one node above the current node on the path of the decision tree through which a prediction value of the unknown data has been obtained is traced. In the next step 104, it is determined whether or not the traced node indicates a branch rule of the attribute set to be changed in step 7 shown in FIG. 13. If the node indicates the branch rule of the attribute to be changed, the determination is YES, control is passed to step 105, the description of the attribute value in the unknown data is changed such that the nodes below the traced node can be different from those processed above, thereby passing control to step 106. Otherwise, the determination is NO, thereby returning control to step 102 to trace further one level above.

In step 106, it is determined whether or not the attribute value whose description has been changed is in the search range of the attribute set in step 9 shown in FIG. 13. If the changed attribute value is not in the corresponding search range, then the determination is NO, and control is returned to step 102 to trace one node above the current node. The change of an attribute value is stopped. Otherwise, the determination is YES, thereby passing control to step 107.

In step 107, a result value of the unknown data is predicted by tracing the decision tree forward (downward) from the current node. In step 108, it is determined whether or not the predicted result value is a desired prediction value. If the desired prediction value can be predicted as a result value, then the determination is YES, and control is passed to step 109. Otherwise, the determination is NO, thereby returning control to step 102 to trace one node above.

In step 109, the known data from which a result value can be predicted by the path leading to the desired prediction value, and which has the desired prediction value as the result value is extracted from the known data DB 100. Then, in the next step 110, the extracted known data is output as an execution result of the prediction analyzing process. Thereafter, a series of processes terminate.

The output known data refers to all data extracted from the known data DB 100, the known data closest (most similar) to the unknown data in the known data extracted from the known data DB 100, or an average value of the extracted known data. In addition to these known data, the ratio of the data having the result values recognized as desired prediction values to all known data reaching the leaf (leaf node) of the desired prediction value can be output as a certainty factor.

Figure 18:
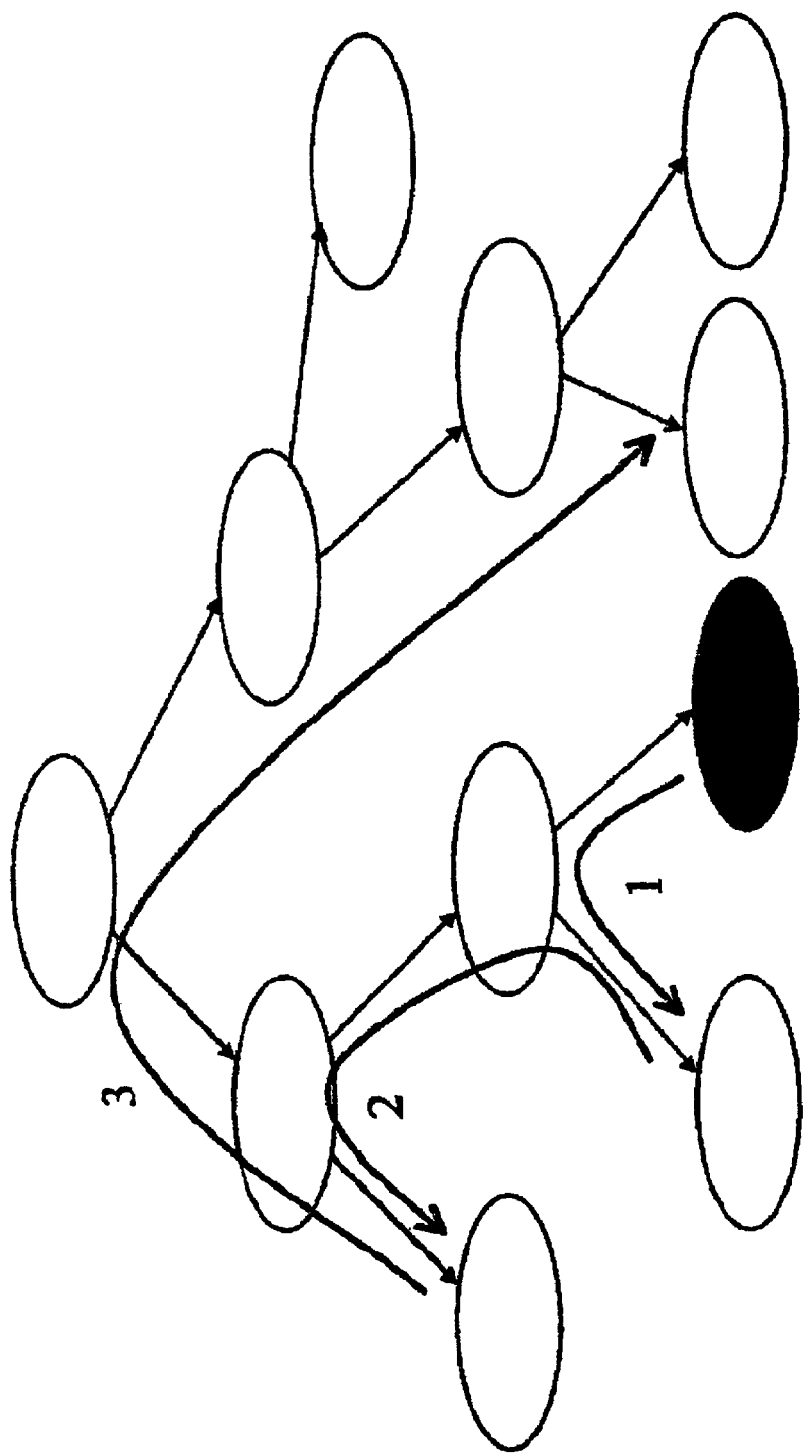
FIG. 18 shows the process of specifying the condition of changing the result value of unknown data into a desired prediction value using a decision tree.

In the above mentioned prediction analyzing process, as shown in FIG. 18, the node having an attribute set to be changed is traced upward starting with the leaf having a predicted result value of the unknown data, the attribute value of the unknown data corresponding to the attribute of the node is changed, and a prediction is made. This process is repeatedly performed until the predicted result value reaches a desired prediction value. Thus, the path leading to the desired prediction value is specified, and the known data whose result value can be predicted through the path is extracted and output. As the known data, the known data for reference, not having a desired prediction value as a result value, can be extracted and output.

Figure 19:
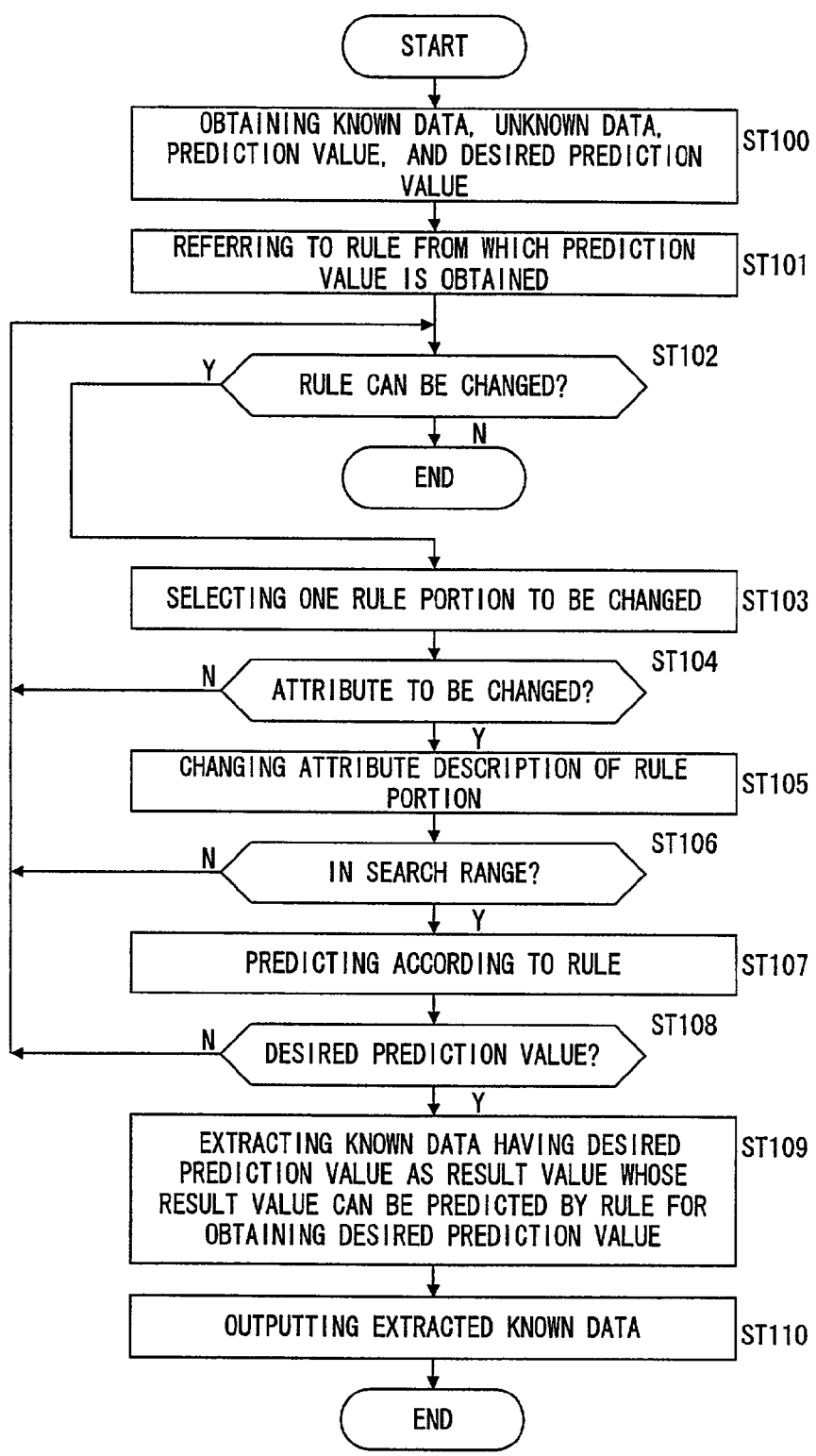
FIG. 19 is a flowchart (4) of a prediction analyzing process.

Then, the prediction analyzing process performed when a result value of the unknown data is predicted according to the rules as shown in FIG. 3 is described in detail by referring to the flowchart shown in FIG. 19. Each rule refers to one or more condition units (rule portion), and the data having a result value under the condition indicated by the condition unit.

First, in step 100, the known data read from the known data DB 100, the unknown data input from the terminal 2 to be analyzed, a prediction value (predicted result value) of the unknown data obtained by the prediction mechanism 300, and the user-desired prediction value are obtained.

Then, in step 101, the rule according to which a prediction value of the unknown data has been obtained is referenced. In the next step 102, it is determined whether or not the rule can be changed. If there is no condition unit having no contents to be changed, then determination is NO, thereby terminating a series of processes. Otherwise, the determination is YES, thereby passing control to step 103.

In step 103, one condition unit to be changed in the condition units (rule portions) forming rules is selected. In the next step 104, it is determined whether or not the attribute whose condition is indicated by the selected condition unit has been set as an attribute to be changed in step 7 shown in FIG. 13. If the attribute indicated by the condition unit is set as an attribute to be changed, then the determination is YES, thereby passing control to step 105. Otherwise, the determination is NO, thereby returning control to the above mentioned step 102 to observe another condition unit (rule portion).

In step 105, the description of the attribute value of the condition unit (rule portion) selected in step 103 is changed. For example, if 'D≧3' is described, then it is changed into 'D<3' (refer to FIG. 20). Then, in step 106, it is determined whether or not the attribute value after the change is in the search range of the attribute set in step 9 shown in FIG. 13. If the attribute value after the change is not in the corresponding search range, then the determination is NO, thereby returning to the above mentioned step 102 to observe another condition unit (rule portion). Otherwise, the determination is YES, and control is passed to step 107.

In step 107, a result value is predicted according to the rule based on which the description of the condition unit has been changed. In step 108, it is determined whether or not the predicted result value is a desired prediction value. If the desired prediction value can be predicted as a result value, that is, if a rule which contains all condition units of the rule, and the result value referring to a desired prediction value is generate by the prediction function generation mechanism 200, then the determination is YES, thereby passing control to step 109. Otherwise, the determination is NO, thereby returning control to the above mentioned step 102 to observe another condition unit (rule portion).

In step 109, the known data from which a result value can be predicted by the rule for obtaining a desired prediction value, and which has a desired prediction value as the result value is extracted from the known data DB 100. In the next step 110, the extracted known data is output as an execution result of the prediction analyzing process, thereby terminating a series of processes.

The output known data refers to all data extracted from the known data DB 100, the known data closest (most similar) to the unknown data in the known data extracted from the known data DB 100, a predetermined pieces of known data from the closest piece to the unknown data, or an average value of the extracted known data. In addition to these known data, the ratio of the data having the result values recognized as desired prediction values to all known data for which a result value can be predicted by the rule for obtaining the desired prediction value can be output as a certainty factor.

In the above mentioned prediction analyzing process, the process of making a prediction by changing the condition of the attribute value described by a condition unit (rule portion) forming part of a rule used in predicting a result value of the unknown data is repeatedly performed until either a predicted result value matches a desired prediction value, or there is no more condition unit whose description can be changed. For example, as shown in FIG. 20, starting with the rightmost condition unit in the rule, the condition units to be changed are sequentially shifted, the descriptions of the condition units are changed, thereby making a prediction. A condition unit whose result value does not match a desired prediction value even after changing the description is deleted from the rule. Thus, by making a prediction each time a rule for predicting a result value of the unknown data is changed, the rule to be considered to set the prediction value of the unknown data as a desired prediction value is extracted from all rules, and the known data having a desired prediction value as a result value which can be predicted by the extracted rules is output as an analysis result.

FIG. 21 is a flowchart of the prediction analyzing process performed when a result value of the unknown data is predicted by the prediction mechanism 300 through a neural network as shown in FIG. 7. The neural network is obtained by learning the known data.

First, in step 100, the known data read from the known data DB 100, the unknown data input from the terminal 2 to be analyzed, a prediction value (predicted result value) of the unknown data obtained by the prediction mechanism 300, and the user-desired prediction value are obtained.

In the next step 101, the unknown data is input to the neural network to perform the iterative inversion method. As a result, the attribute value of the unknown data is changed by back-propagation of the error between a prediction value and a desired prediction value through the neural network, thereby passing control to step 102.

In the back propagation method, as shown in FIGS. 8 through 10, the error between the prediction value and a teaching value (a result value in this embodiment) is back-propagated to change the weight. On the other hand, in the iterative inversion method, as shown in FIG. 22, the error between the prediction value and the teaching value (a desired prediction value in this embodiment) is back-propagated to the input value (attribute value) to update the input value. Therefore, by performing the iterative inversion method, the attribute value of the unknown data for which a desired prediction value can be output is obtained.

In step 102, it is determined whether or not there is an attribute set to be changed in step 7 shown in FIG. 13. If there is an attribute set to be changed, then the determination is YES, control is passed to step 103, only the value of the attribute set to be changed is changed into a value obtained by the iterative inversion method, and control is passed to step 105. Otherwise, the determination is NO, control is passed to step 104, the values of all attributes whose values have been updated by the iterative inversion method, and the control is passed to step 105.

In step 105, it is determined whether or not the attribute value changed in the above mentioned step 103 or 104 is in the search range set in step 9 shown in FIG. 13. If the search range is not set or the changed attribute value is in the corresponding search range, then determination is YES, and control is passed to step 106. Otherwise, the determination is NO, it is determined that the unknown data for which a desired prediction value can be obtained by changing an attribute value in the iterative inversion method cannot be specified, and a series of processes terminate.

In step 106, the unknown data whose attribute value has been changed in the above mentioned step 103 or 104 is input to the neural network to make a prediction. Then, in step 107, it is determined whether or not the prediction value obtained in the prediction matches the desired prediction value. When the output of the neural network matches the desired prediction value, the determination is YES, control is passed to step 108, the unknown data whose attribute value has been changed is output as a result of performing the prediction analyzing process, and a series of processes terminate. Otherwise, the determination is NO, control is returned to the above mentioned step 101, and the iterative inversion method is performed again.

Thus, in the above mentioned prediction analyzing process, the attribute value of the unknown data is changed such that the prediction value obtained through the neural network after the learning can match the desired prediction value, and the unknown data having the attribute value after the change is output as an analysis result. However, not the attribute value after the change, but the amount of change from the original attribute value can also be output. In addition, the known data is not output as an analysis result. Therefore, if the prediction mechanism 300 is provided in the prediction analysis apparatus 1 for making a prediction through a learned neural network, then it is not necessary for the prediction analysis apparatus 1 to be provided with the known data DB 100, and the prediction function generation mechanism 200.

When the prediction mechanism 300 shown in FIG. 4 predicts a result value by an equation such as '$Y = \Sigma A_i \times X_i$' ($X_i$ indicates an attribute value, $A_i$ indicates a coefficient, and Y indicates a result value), an attribute value from which a desired prediction value can be obtained in the inverse computation method as shown in FIG. 23, or an amount of change to obtain the attribute value can be computed. The flowchart of the prediction analyzing process performed for the process is basically the same as that shown in FIG. 21 except that the steps 101 and 106 are different based on the difference in the methods. Therefore, the detailed explanation is omitted here.

The above mentioned prediction analysis apparatus can be widely applied not only to a manufacturing industry, but also to a distribution business, a financial business, etc. It can also be applied to data mining for providing more effective services. For example, on the site of Internet, a banner advertisement effective to an accessing user can be presented at a higher probability using the prediction analysis apparatus.

As described above, according to the present invention, a user can have a desired prediction value as a result value when the prediction value (predicted result value) of the unknown data does not match a desired prediction value, and can obtain the known data similar to the unknown data. Therefore, the user can be informed how to amend an attribute value of the unknown data to change the prediction value into a desired prediction value.

Furthermore, according to the present invention, when a prediction value of the unknown data is not a desired prediction value, a user can obtain an attribute value of the unknown data whose desired prediction value is a prediction value, or an amount of a change into the attribute value. Therefore, to change a prediction value into a desired prediction value, the user can be informed how an attribute value of the unknown data can be changed.

What is claimed is:

1. A prediction analysis apparatus, comprising:
   a prediction unit predicting a result value corresponding to one or more attribute values of unknown data using known data indicating correspondence between one or more attribute values and corresponding result values; and
   an analysis unit outputting analysis information indicating how at least one attribute value of the unknown data is to be amended to change a result value predicted by said prediction unit into a desired prediction value.

2. The apparatus according to claim 1, wherein
   said analysis unit extracts known data having the desired prediction value as a result value, and having one or more attribute values similar to one or more attribute values of the unknown data from know data, and outputs the extracted known data as the analysis information.

3. The apparatus according to claim 2, wherein
   said analysis unit extracts known data similar to the unknown data from the known data with an importance factor of each attribute taken into account.

4. The apparatus according to claim 3, wherein
   said analysis unit uses an influence factor on a result value from each attribute obtained by memory-based reasoning as the importance factor.

5. The apparatus according to claim 3, wherein
   said analysis unit uses a weight obtained from learning of a structured neural network as the importance factor.

6. The apparatus according to claim 2, wherein
   said analysis unit generates one piece of known data by performing a predetermined operation on plural pieces of known data when the plural pieces of known data are extracted from the known data, and outputs the generated known data.

7. The apparatus according to claim 2, wherein
   said analysis unit outputs predetermined pieces of known data in order from data most similar to the unknown data in plural pieces of known data when the plural pieces of known data are extracted from the known data.

8. The apparatus according to claim 1, wherein
   said analysis unit outputs at least one attribute value of unknown data whose desired prediction value is to be predicted as a result value, or an amount of a change into the at least one attribute value as the analysis information.

9. The apparatus according to claim 8, wherein
   said analysis unit specifies the at least one attribute value of unknown data whose desired prediction value is to be predicted as a result value, or an amount of a change into the at least one attribute value through a neural network.

10. The apparatus according to claim 1, wherein
    said analysis unit refers to a decision tree, specifies a path through which the desired prediction value is to be predicted as a result value of the unknown data, extracts known data whose result value is predicted through the specified path, and outputs the extracted known data as the analysis information.

11. The apparatus according to claim 10, wherein
    said analysis unit also outputs a certainty factor in the specified path.

12. The apparatus according to claim 1, wherein
when a result value of unknown data is predicted by referring to rules indicating one or more condition units presenting a condition of the attribute value and a result value under a condition indicated by the condition units, said analysis unit changes a condition indicated by a condition unit in the condition units of a rule used to predict a result value of the unknown data in the rules so that a rule to be referenced in the rules for prediction of the desired prediction value as a result value of the unknown data, known data whose result value can be predicted based on the specified rule and which has a desired prediction value as the result value can be extracted, and the extracted known data can be output as the analysis information.

13. The apparatus according to claim 1, wherein
said analysis unit sets an attribute whose attribute value is to be changed in attributes of the unknown data, and obtains the analysis information by changing the attribute value of the set attribute.

14. The apparatus according to claim 13, wherein
said attribute to be changed can be set by a user in an interactive mode.

15. The apparatus according to claim 13, wherein
said analysis unit sets the attribute to be changed with an importance factor of each attribute taken into account.

16. The apparatus according to claim 15, wherein
said analysis unit uses an influence factor on a result value from each attribute obtained by memory-based reasoning as the importance factor.

17. The apparatus according to claim 15, wherein
said analysis unit uses a weight obtained from learning of a structured neural network as the importance factor.

18. The apparatus according to claim 13, wherein
said analysis unit sets a search range of an attribute value of an attribute set to be changed, and obtains the analysis information by changing an attribute value of the attribute set to be changed in a corresponding search range.

19. A prediction analysis apparatus, comprising:
a prediction unit predicting a result value corresponding to one or more attribute values of unknown data according to predicting information for predicting the result value; and
an analysis unit outputting analysis information indicating how at least one attribute value of the unknown data is to be amended to change a result value predicted by said prediction unit into a desired prediction value.

20. A computer-readable storage medium storing a program used to direct a computer to perform the processes of:
predicting a result value corresponding to one or more attribute values of unknown data using known data indicating correspondence between one or more attribute values and corresponding result values; and
outputting analysis information indicating how at least one attribute value of the unknown data is to be amended to change a result value predicted in said predicting process into a desired prediction value.

* * * * *

UNITED STATES PATENT AND TRADEMARK OFFICE
CERTIFICATE OF CORRECTION

PATENT NO. : 6,988,090 B2
APPLICATION NO. : 09/817257
DATED : January 17, 2006
INVENTOR(S) : Yoshinori Yaginuma It is certified that error appears in the above-identified patent and that said Letters Patent is hereby corrected as shown below:

On Title Page Item (56)
First Page, (Other Publications), Line 4, change " "Preciction" to --"Prediction--.

On Title Page Item (56)
First Page, (Other Publications), Line 5, after "ACM" insert --,--.

On Title Page Item (56)
First Page, (Other Publications), Line 7, after "Sys." insert --,--.

On Title Page Item (56)
First Page, (Other Publications), Line 11, after "conf." insert --,--.

On Title Page Item (56)
First Page, (Other Publications), Line 15, after "ACM" insert --,--.

Column 16, Line 19, change "know" to --known--.

Signed and Sealed this

Third Day of April, 2007

JON W. DUDAS
*Director of the United States Patent and Trademark Office*